US012739813B2

(12) United States Patent
Amiri et al.

(10) Patent No.: US 12,739,813 B2
(45) Date of Patent: Sep. 15, 2026

(54) DIGITAL TWIN BASED BEAM MANAGEMENT

(71) Applicant: QUALCOMM Incorporated, San Diego, CA (US)

(72) Inventors: Roohollah Amiri, San Diego, CA (US); Marwen Zorgui, San Diego, CA (US); Srinivas Yerramalli, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/592,591

(22) Filed: Mar. 1, 2024

(65) Prior Publication Data

US 2025/0280405 A1 Sep. 4, 2025

(51) Int. Cl.
*H04W 72/04* (2023.01)
*H04B 7/06* (2006.01)
*H04W 72/044* (2023.01)

(52) U.S. Cl.
CPC ........ *H04W 72/046* (2013.01); *H04B 7/0696* (2023.05); *H04B 7/06964* (2023.05)

(58) Field of Classification Search
CPC ............... H04W 72/046; H04B 7/0696; H04B 7/06964
See application file for complete search history.

(56) References Cited

U.S. PATENT DOCUMENTS

2019/0379508 A1* 12/2019 Xiang .................. H04L 5/0091
2020/0337024 A1* 10/2020 Tang .................... H04L 5/0048
2021/0314039 A1* 10/2021 Khalid ............... H04W 64/003
2022/0007310 A1* 1/2022 Najla .................... H04W 24/06
2023/0062443 A1* 3/2023 Chakraborty ......... H04W 24/04
2023/0421635 A1* 12/2023 He ......................... H04L 45/44
2024/0073702 A1* 2/2024 Kim ..................... H04B 7/0456
2025/0007597 A1* 1/2025 Zhu ...................... H04B 7/0404
2026/0095287 A1* 4/2026 Ge ........................ H04L 5/0051

* cited by examiner

*Primary Examiner* — Junpeng Chen
(74) *Attorney, Agent, or Firm* — QUALCOMM Incorporated

(57) ABSTRACT

Various aspects of the present disclosure generally relate to wireless communication. In some aspects, a first wireless communication device may transmit, to a digital twin (DT) entity, a request for channel characteristics of a communication link associated with a second wireless communication device, the DT entity being associated with a three-dimensional digital model of a physical operating environment associated with the first wireless communication device and the second wireless communication device. The first wireless communication device may receive, from the DT entity, a response indicating one or more channel characteristics for the communication link that are associated with the three-dimensional digital model. The first wireless communication device may communicate with the second wireless communication device in association with the one or more channel characteristics. Numerous other aspects are described.

20 Claims, 9 Drawing Sheets

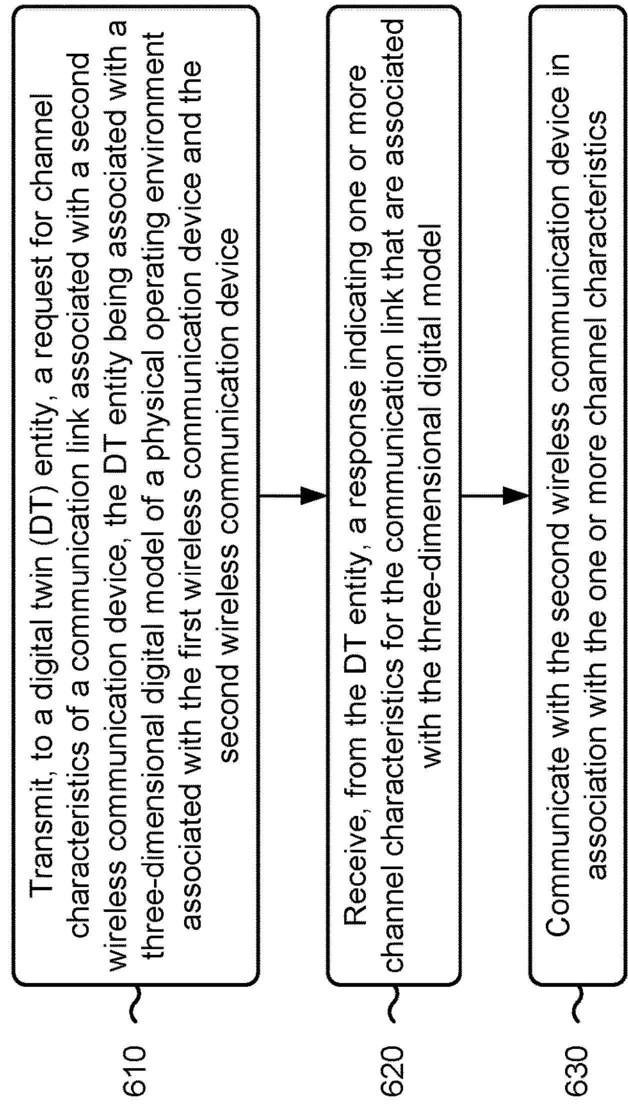
600
610
Transmit, to a digital twin (DT) entity, a request for channel characteristics of a communication link associated with a second wireless communication device, the DT entity being associated with a three-dimensional digital model of a physical operating environment associated with the first wireless communication device and the second wireless communication device
620
Receive, from the DT entity, a response indicating one or more channel characteristics for the communication link that are associated with the three-dimensional digital model
630
Communicate with the second wireless communication device in association with the one or more channel characteristics

FIG. 6

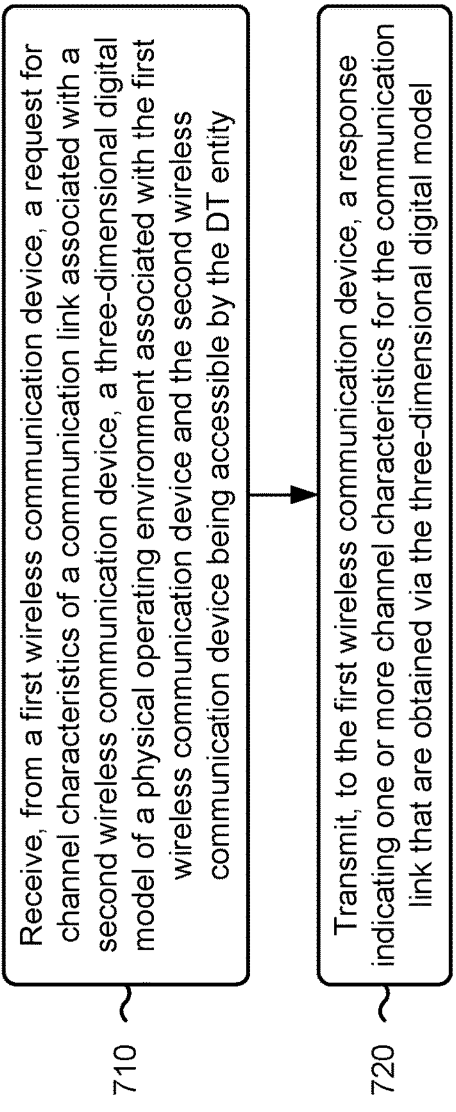
FIG. 7

DIGITAL TWIN BASED BEAM MANAGEMENT

FIELD OF THE DISCLOSURE

Aspects of the present disclosure generally relate to wireless communication and specifically relate to techniques, apparatuses, and methods associated with digital twin based beam management.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a first wireless communication device for wireless communication includes one or more memories; and one or more processors, coupled to the one or more memories, configured to cause the first wireless communication device to: transmit, to a digital twin (DT) entity, a request for channel characteristics of a communication link associated with a second wireless communication device, the DT entity being associated with a three-dimensional digital model of a physical operating environment associated with the first wireless communication device and the second wireless communication device; receive, from the DT entity, a response indicating one or more channel characteristics for the communication link that are associated with the three-dimensional digital model; and communicate with the second wireless communication device in association with the one or more channel characteristics.

In some aspects, a method of wireless communication performed by a first wireless communication device includes transmitting, to a DT entity, a request for channel characteristics of a communication link associated with a second wireless communication device, the DT entity being associated with a three-dimensional digital model of a physical operating environment associated with the first wireless communication device and the second wireless communication device; receiving, from the DT entity, a response indicating one or more channel characteristics for the communication link that are associated with the three-dimensional digital model; and communicating with the second wireless communication device in association with the one or more channel characteristics.

In some aspects, a non-transitory computer-readable medium storing a set of instructions for wireless communication includes one or more instructions that, when executed by one or more processors of a first wireless communication device, cause the first wireless communication device to: transmit, to a DT entity, a request for channel characteristics of a communication link associated with a second wireless communication device, the DT entity being associated with a three-dimensional digital model of a physical operating environment associated with the first wireless communication device and the second wireless communication device; receive, from the DT entity, a response indicating one or more channel characteristics for the communication link that are associated with the three-dimensional digital model; and communicate with the second wireless communication device in association with the one or more channel characteristics.

In some aspects, a first apparatus for wireless communication includes means for transmitting, to a DT entity, a request for channel characteristics of a communication link associated with a second apparatus, the DT entity being associated with a three-dimensional digital model of a physical operating environment associated with the first apparatus and the second apparatus; means for receiving, from the DT entity, a response indicating one or more channel characteristics for the communication link that are associated with the three-dimensional digital model; and means for communicating with the second apparatus in association with the one or more channel characteristics.

In some aspects, a DT entity for wireless communication includes one or more memories; and one or more processors, coupled to the one or more memories, configured to cause the DT entity to: receive, from a first wireless communication device, a request for channel characteristics of a communication link associated with a second wireless communication device, a three-dimensional digital model of a physical operating environment associated with the first wireless communication device and the second wireless communication device being accessible by the DT entity; and transmit, to the first wireless communication device, a response indicating one or more channel characteristics for the communication link that are obtained via the three-dimensional digital model.

In some aspects, a method of wireless communication performed by a DT entity includes receiving, from a first wireless communication device, a request for channel characteristics of a communication link associated with a second wireless communication device, a three-dimensional digital model of a physical operating environment associated with the first wireless communication device and the second wireless communication device being accessible by the DT entity; and transmitting, to the first wireless communication device, a response indicating one or more channel characteristics for the communication link that are obtained via the three-dimensional digital model.

In some aspects, a non-transitory computer-readable medium storing a set of instructions for wireless communication includes one or more instructions that, when executed by one or more processors of a DT entity, cause the DT entity to: receive, from a first wireless communication device, a request for channel characteristics of a communication link associated with a second wireless communication device, a three-dimensional digital model of a physical operating environment associated with the first wireless communication device and the second wireless communication device being accessible by the DT entity; and transmit, to the first wireless communication device, a response indicating one or more channel characteristics for the communication link that are obtained via the three-dimensional digital model.

In some aspects, an apparatus for wireless communication includes means for receiving, from a first wireless communication device, a request for channel characteristics of a communication link associated with a second wireless communication device, a three-dimensional digital model of a physical operating environment associated with the first wireless communication device and the second wireless communication device being accessible by the DT entity; and means for transmitting, to the first wireless communication device, a response indicating one or more channel characteristics for the communication link that are obtained via the three-dimensional digital model.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 6 is a diagram illustrating an example process performed, for example, at a first wireless communication device or an apparatus of a first wireless communication device, in accordance with the present disclosure.

FIG. 7 is a diagram illustrating an example process performed, for example, at a DT entity or an apparatus of a DT entity, in accordance with the present disclosure.

DETAILED DESCRIPTION

Figure 1:
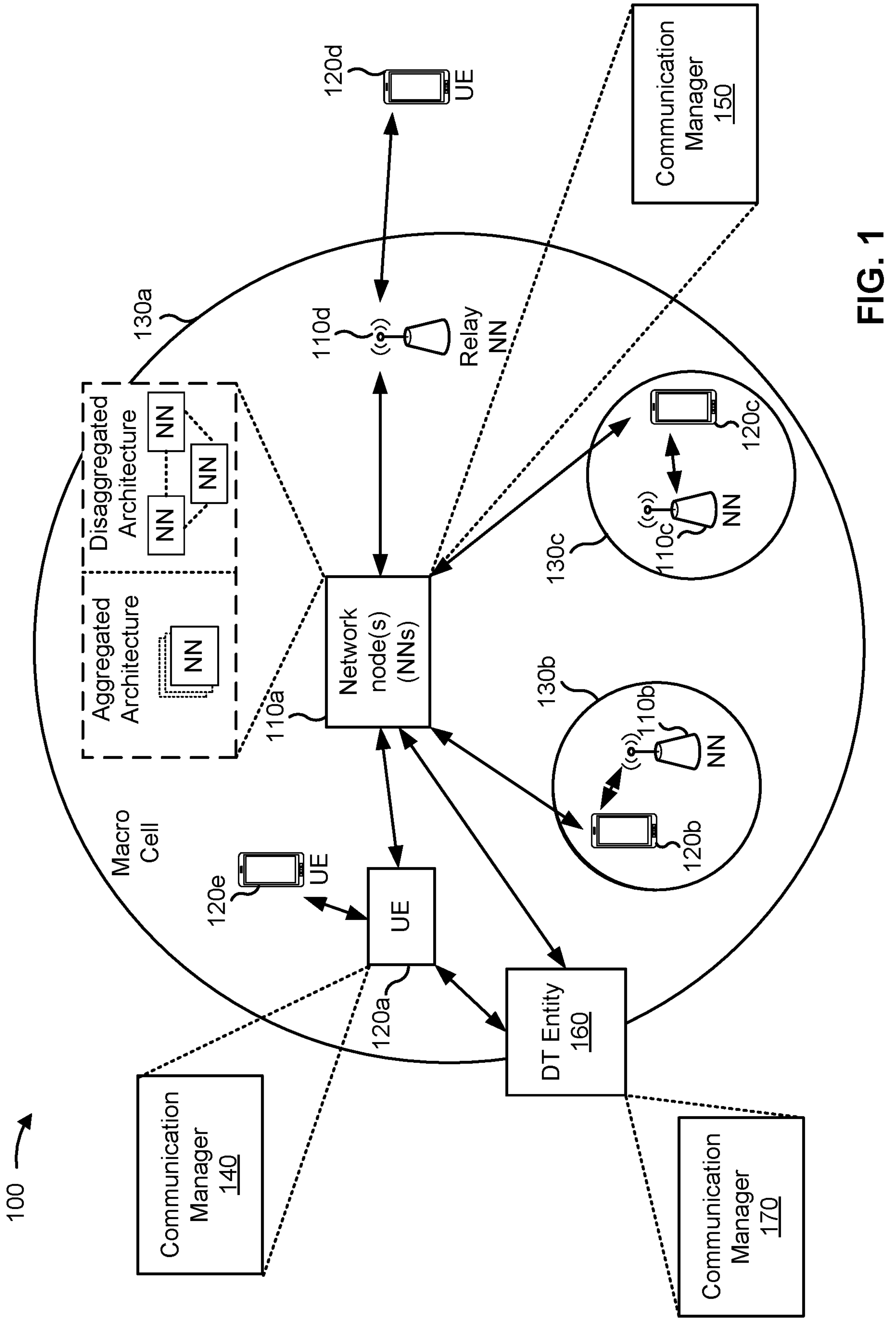
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A digital twin (DT) may be an information set including information regarding a network deployment and properties associated with the network deployment. For example, a DT may be representative of an area (e.g., a geographic area), such as one or more cells, a sub-cell (e.g., a part of a cell, a subset of a coverage area of a cell), and/or an environment, among other examples. The DT may include a representation of one or more radio emitters (such as a location of a radio emitter, a physical configuration of the radio emitter, and/or a radio configuration of the radio emitter), one or more objects (such as geometry of the one or more objects and/or physical properties of the one or more objects, including reflection or absorption properties), a geographical layout, and/or a channel (such as propagation properties of the channel, including signal attenuation), among other examples. The DT may be a digital or virtual representation of a physical operating environment for a wireless communication network (e.g., where the physical operating environment is a physical twin corresponding to the DT). The DT may be a virtual representation of a real-world physical system or product (e.g., a physical twin) that serves as a digital counterpart for one or more purposes, such as planning, operational simulation, integration, testing, monitoring, and/or maintenance, among other examples.

For example, the DT may represent a full lifecycle of a physical network process, such as using a physical model, sensor information, operational history, and/or other data. The DT may be consistent with physical network elements and topology of a cell or sub-cell represented by the DT. The DT may be a digital representation of a physical environment associated with one or more cells (e.g., covering an outdoor environment and/or an indoor environment). For example, the DT may include a digital model or representation of a geographic area. The DT may be, or may include, a three-dimensional digital model of a physical operating environment. The DT may represent a physical environment, such as a coverage area of one or more cells, a building, a factory, a city, and/or a neighborhood, among other examples.

A DT entity may obtain channel information via the DT. For example, the DT entity may use input information to model or analyze a communication channel between two or more wireless communication devices in the digital representation of the physical operating environment that is modeled by the DT. For example, the DT and/or the DT entity may use one or more techniques to represent wireless communication channels (such as propagation properties of respective wireless communication channels) via the three-dimensional model of the physical operating environment. For example, the DT and/or the DT entity may use ray tracing to simulate or model how radio frequency (RF) signals would interact with the physical operating environment. For example, in wireless communication, the physical operating environment may impact RF signal propagation (e.g., by blocking, deflecting, refracting, or otherwise impacting the RF signals). The DT may model objects in the physical operating environment as reflective and/or refractive objects (e.g., depending on characteristics associated with the objects). The DT may simulate or model paths that an RF signal may take as the RF signal propagates through the physical operating environment. The paths may include a direct path between a transmitting device and a receiving device and one or more reflected, diffracted, and/or scattered paths. By tracing these paths, the DT may provide insights into signal strength, multipath effects, and/or other propagation characteristics of wireless communication channels. Additionally, the DT may simulate or model multipath propagation in the wireless communication network by tracing multiple rays and accounting for the different propagation paths and respective delays, attenuations, and/or phases. This multipath propagation information may improve an understanding of signal degradation, fading, and/or interference in the wireless communication network.

By using channel information obtained via the DT, a performance and/or resource utilization efficiency of wireless communications in the physical operating environment may be improved. For example, a wireless communication device may use the channel information to improve one or more communication parameters (e.g., spatial domain information (e.g., a beam), frequency domain resources, bandwidth, bandwidth size, a modulation and coding scheme (MCS), transmit power, and/or another communication parameter) used for one or more wireless communications in the wireless communication network. This may conserve network resources (e.g., time domain resources and/or frequency domain resources), processing resources, power resources (e.g., device energy or battery), and/or memory resources, among other examples, that would have otherwise been associated with transmitting, receiving, processing, and/or measuring, among other examples, one or more signals (e.g., reference signals) to determine values for the one or more communication parameters. Additionally, this may reduce latency for data being transmitted between wireless communication devices that would have otherwise been associated with transmitting, receiving, processing, and/or measuring, among other examples, one or more signals (e.g., reference signals) to determine values for the one or more communication parameters.

For example, a wireless communication device may use the channel information to select a best spatial direction (e.g., a best beam or beam pair) to use for communications with another wireless communication device (e.g., without having to transmit, receive, process, and/or measure, among other examples, one or more signals over a set of spatial directions to determine the best spatial direction). For example, typically, a network node and a user equipment (UE) may perform one or more beam management procedures to identify, select, and/or refine a beam or beam pair to be used for communications between the network node and the UE. For example, the network node and the UE may perform a first beam management procedure (e.g., a P1 beam management procedure, a beam selection procedure, an initial beam acquisition procedure, a beam sweeping procedure, a cell search procedure, and/or a beam search procedure), a second beam management procedure (e.g., a P2 beam management procedure, a beam refinement procedure, a network node beam refinement procedure, a transmission reception point (TRP) beam refinement procedure, and/or a transmit beam refinement procedure), and a third beam management procedure (e.g., a P3 beam management procedure, a beam refinement procedure, a UE beam refinement procedure, and/or a receive beam refinement procedure) to identify, select, and/or refine a beam or beam pair to be used for communications between the network node and the UE. Each beam management procedure may include the network node and/or the UE performing beam sweeping over multiple transmit (Tx) beams (e.g., transmit a signal (e.g., a synchronization signal block (SSB) or channel station information (CSI) reference signal (CSI-RS)) using each transmit beam for beam management. As a result, beam management may be network resource intensive, may consume significant power resources, and/or may introduce delays or latency in data communications between the network node and the UE, among other examples. The channel information obtained via the DT may be used to improve the efficiency of the beam management procedure(s) (e.g., by indicating a best beam or beam pair and/or enabling the network node and/or the UE to reduce the quantity of beams used for the beam management procedure(s)).

However, the DT entity (and/or the DT) may not have access to reliable, accurate, and/or up-to-date input information to enable the DT to obtain accurate channel information. For example, wireless communication devices (e.g., UEs) may be mobile devices that may change physical locations within the physical operating environment. The DT entity (and/or the DT) may not have access to up-to-date location information for wireless communication devices within the physical operating environment, reducing the relevance and/or applicability of the channel information obtained via the DT. Additionally, different wireless communication devices may have different beamforming capabilities. For example, different wireless communication devices may be capable of communicating using different quantities of beams, different shapes of beams (such as the amplitude, width, and/or presence of side lobes) and/or different directions of beams, among other examples. Using an incorrect or inaccurate beamforming capability of a wireless communication device when obtaining the channel information via the DT may result in inaccurate, irrelevant, or inapplicable channel information.

Various aspects relate generally to DT based beam management. Some aspects more specifically relate to an operation associated with a DT entity and a wireless communication device to enable the wireless communication device to request and/or receive information associated with one or more desired channel characteristics via a DT that is accessible by the DT entity. In some aspects, the operation may enable the wireless communication device to provide input information that enables the DT entity to obtain accurate and/or up-to-date channel characteristics via the DT.

For example, the wireless communication device (e.g., a first wireless communication device) may transmit, and the DT entity may receive, a request for channel characteristics of a communication link associated with a second wireless communication device (e.g., the communication link may be between the second wireless communication device and a transmission reception point associated with the first wireless communication device). The communication link may also be referred to herein as a communication channel or channel. The request may indicate request information, such as first location information associated with the first wireless communication device, second location information associated with the second wireless communication device, timing information applicable to the request for channel characteristics, beam information associated with the first wireless communication device, and/or beam information associated with the second wireless communication device, among other examples.

The DT entity may transmit, and the first wireless communication device may receive, a response indicating one or more channel characteristics for the communication link that are associated with the DT (e.g., the one or more channel characteristics may be associated with the DT in that the one or more channel characteristics may be obtained by the DT entity via the DT). The first wireless communication device may communicate with the second wireless communication device in association with the one or more channel characteristics (e.g., using one or more communication parameters that are indicated by, or are selected using, the one or more channel characteristics). In some aspects, the first wireless communication device may be a network node and the second wireless communication device may be a UE. In other aspects, the first wireless communication device may be a UE and the second wireless communication device may be a network node.

In some aspects, one or more wireless communication devices may perform an operation to transmit beam registration information to the DT entity. The beam registration information may indicate beam information for respective beams that a wireless communication device is capable of forming and/or via which the wireless communication device is capable of communicating. In some aspects, the beam registration information may indicate identifiers for the respective beams. In some aspects, the request (e.g., from the first wireless communication device) may indicate one or more identifiers of beams (e.g., that have been registered with the DT entity) that are applicable to the request.

Particular aspects of the subject matter described in this disclosure can be implemented to realize one or more of the following potential advantages. In some examples, by performing the operation associated with the DT entity and the wireless communication device (e.g., the first wireless communication device), the described techniques can be used to improve the accuracy and/or applicability of channel information (e.g., one or more channel characteristics) that are output via the DT. For example, by the wireless communication device transmitting the request indicating request information, the DT entity may have access to more relevant and/or up-to-date information to use as input information to the DT. This may improve the accuracy and/or applicability of the output of the DT. Additionally, by performing the operation (e.g., a beam registration operation or procedure) to transmit beam registration information to the DT entity, a size of the request may be reduced. For example, by performing the beam registration operation or procedure with the DT entity, the wireless communication device may indicate an identifier (or index) of a registered beam in the request (e.g., rather than indicating full beam information for the registered beam), thereby reducing a size of the request (e.g., because the identifier may have a smaller size than the full beam information) and/or reducing a complexity associated with generating the request. This may conserve network resources, processing resources, and/or power resources, among other examples, that would have otherwise been associated with generating and/or transmitting a request that includes full beam information for respective beams applicable to the request.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some examples, the wireless communication network 100 may include a DT entity 160. The DT entity 160 may be a device or entity that stores, or is configured to access, a DT, as described in more detail elsewhere herein. The wireless communication network 100 may include one or more DT entities 160. For example, the wireless communication network 100 may include multiple DT entities 160 that are associated with respective geographic areas or cells (e.g., that store DTs that model or represent the respective geographic areas or cells). The DT entity 160 may be, or may include, a core network function (e.g., a core network function entity). For example, the DT entity 160 may be an entity, function, and/or service associated with a core network of the wireless communication network 100 (such as a core network 320 described in connection with FIG. 3). As another example, the DT entity 160 may be, or may be included in, a server (e.g., a server device), a cloud computing device or component (e.g., a component deployed in a cloud computing environment), a network controller (e.g., a Near-RT RIC and/or a Non-RT RIC), a CU, a DU, a network node 110, and/or a UE 120, among other examples.

In some aspects, a first wireless communication device (e.g., a UE 120 or a network node 110) may include a communication manager (e.g., a communication manager 140 or a communication manager 150). As described in more detail elsewhere herein, the communication manager may transmit, to a DT entity 160, a request for channel characteristics of a communication link associated with a second wireless communication device, the DT entity 160 being associated with a three-dimensional digital model of a physical operating environment associated with the first wireless communication device and the second wireless communication device; receive, from the DT entity 160, a response indicating one or more channel characteristics for the communication link that are associated with the three-dimensional digital model; and communicate with the second wireless communication device in association with the one or more channel characteristics. Additionally, or alternatively, the communication manager (e.g., the communication manager 140 or the communication manager 150) may perform one or more other operations described herein.

In some aspects, the DT entity 160 may include a communication manager 170. As described in more detail elsewhere herein, the communication manager 170 may receive, from a first wireless communication device (e.g., a UE 120 or a network node 110), a request for channel characteristics of a communication link associated with a second wireless communication device, a three-dimensional digital model of a physical operating environment associated with the first wireless communication device and the second wireless communication device being accessible by the DT entity; and transmit, to the first wireless communication device, a response indicating one or more channel characteristics for the communication link that are obtained via the three-dimensional digital model. Additionally, or alternatively, the communication manager 170 may perform one or more other operations described herein.

As indicated above, FIG. 1 is provided as an example. Other examples may differ from what is described with regard to FIG. 1.

Figure 2:
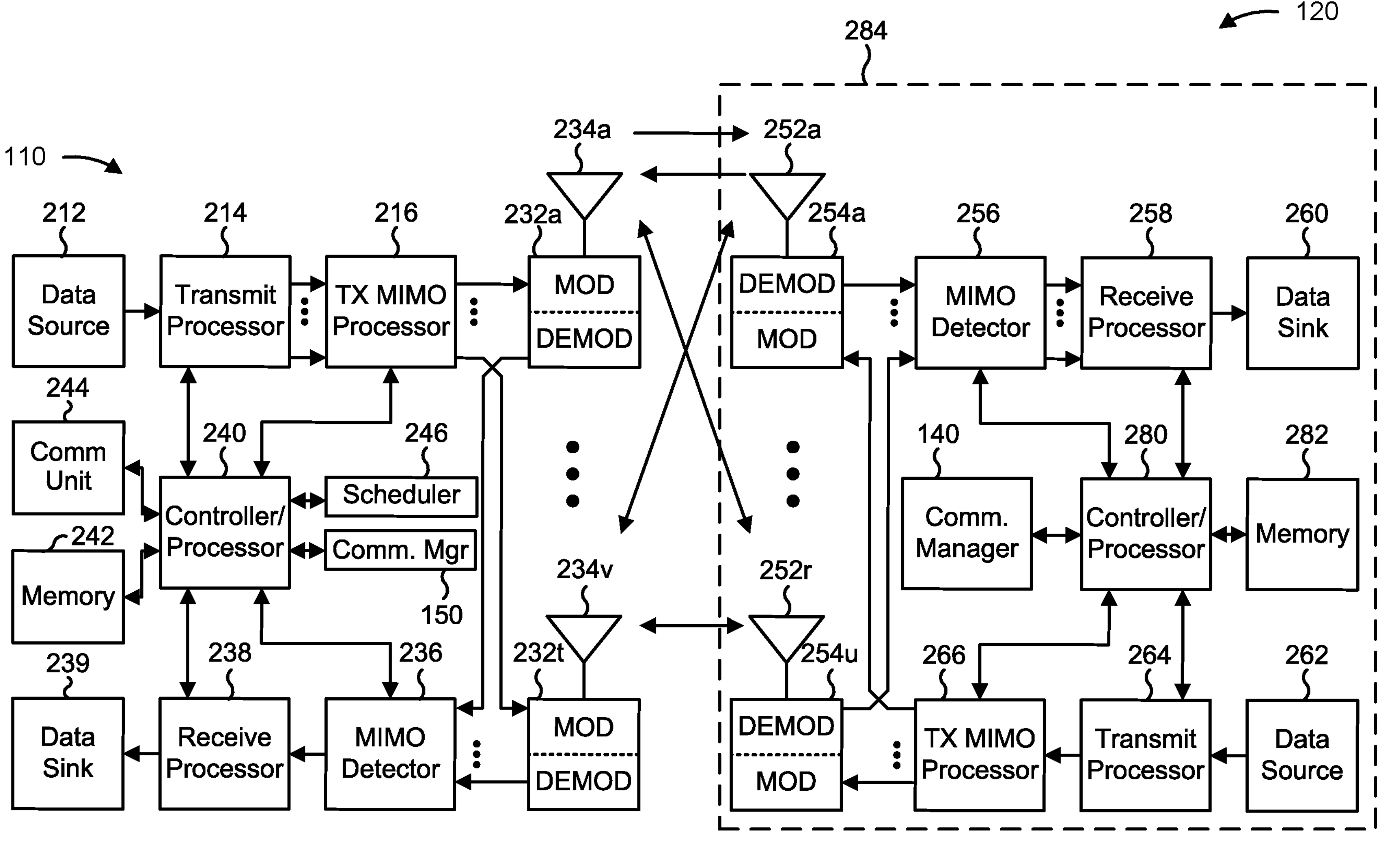
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
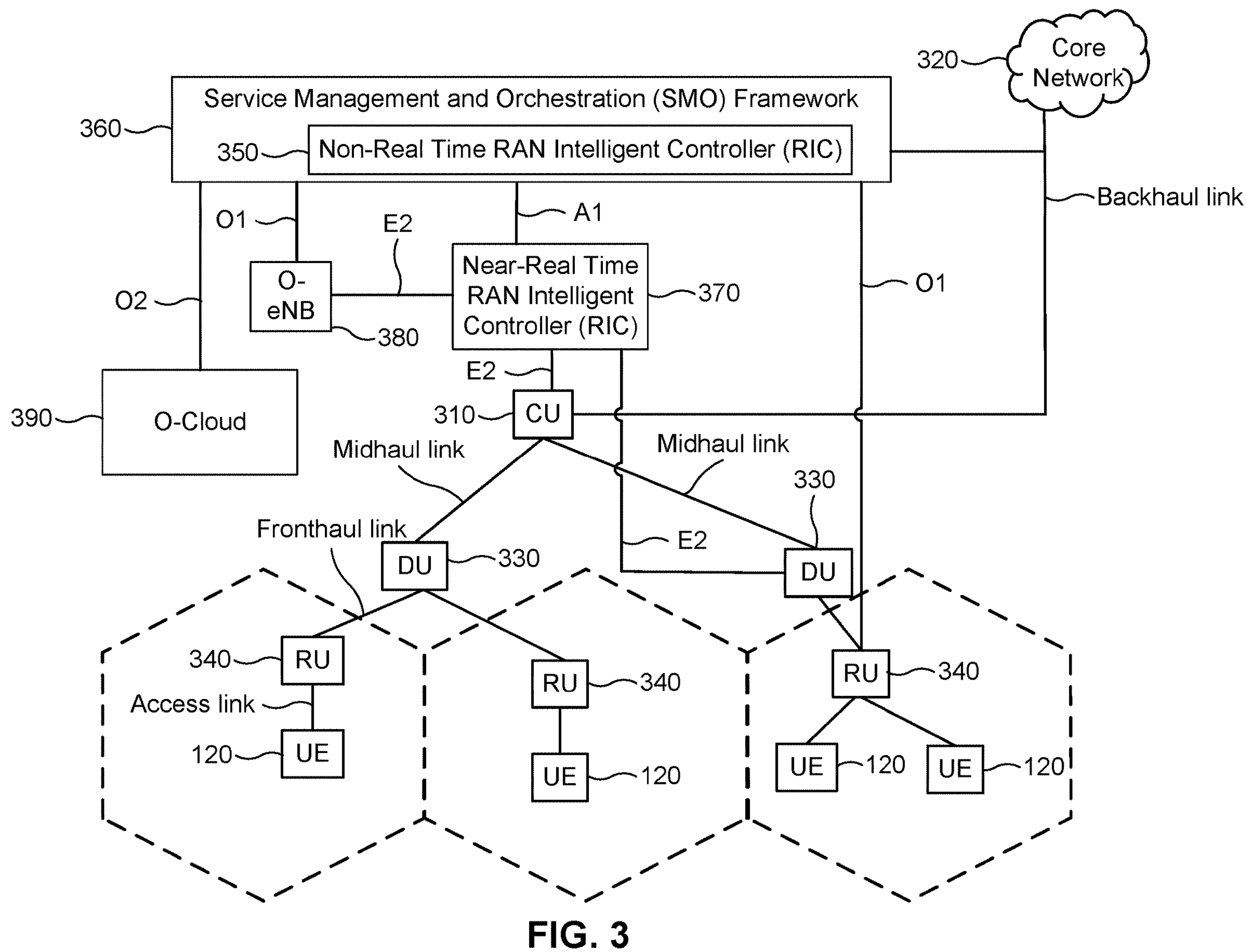
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with DT based beam management, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 600 of FIG. 6, process 700 of FIG. 7, or other processes as described herein (alone or in conjunction with one or more other processors). In some aspects, the wireless communication device described herein is the network node 110, is included in the network node 110, or includes one or more components of the network node 110 shown in FIG. 2. In some other aspects, the wireless communication device described herein is the UE 120, is included in the UE 120, or includes one or more components of the UE 120 shown in FIG. 2.

The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 600 of FIG. 6, process 700 of FIG. 7, or other processes as described herein. In some examples, executing instructions may include running the instructions, converting the instructions, compiling the instructions, and/or interpreting the instructions, among other examples.

In some aspects, a first wireless communication device includes means for transmitting, to a DT entity, a request for channel characteristics of a communication link associated with a second wireless communication device, the DT entity being associated with a three-dimensional digital model of a physical operating environment associated with the first wireless communication device and the second wireless communication device; means for receiving, from the DT entity, a response indicating one or more channel characteristics for the communication link that are associated with the three-dimensional digital model; and/or means for communicating with the second wireless communication device in association with the one or more channel characteristics. In some aspects, the means for the first wireless communication device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some other aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the DT entity 160 includes means for receiving, from a first wireless communication device, a request for channel characteristics of a communication link associated with a second wireless communication device, a three-dimensional digital model of a physical operating environment associated with the first wireless communication device and the second wireless communication device being accessible by the DT entity; and/or means for transmitting, to the first wireless communication device, a response indicating one or more channel characteristics for the communication link that are obtained via the three-dimensional digital model. In some aspects, the means for the DT entity 160 to perform operations described herein may include, for example, one or more of communication manager, a transmit processor, a TX MIMO processor, a modem, an antenna, a MIMO detector, a receive processor, a controller/processor, memory, or a scheduler.

As indicated above, FIG. 3 is provided as an example. Other examples may differ from what is described with regard to FIG. 3.

Figure 4:
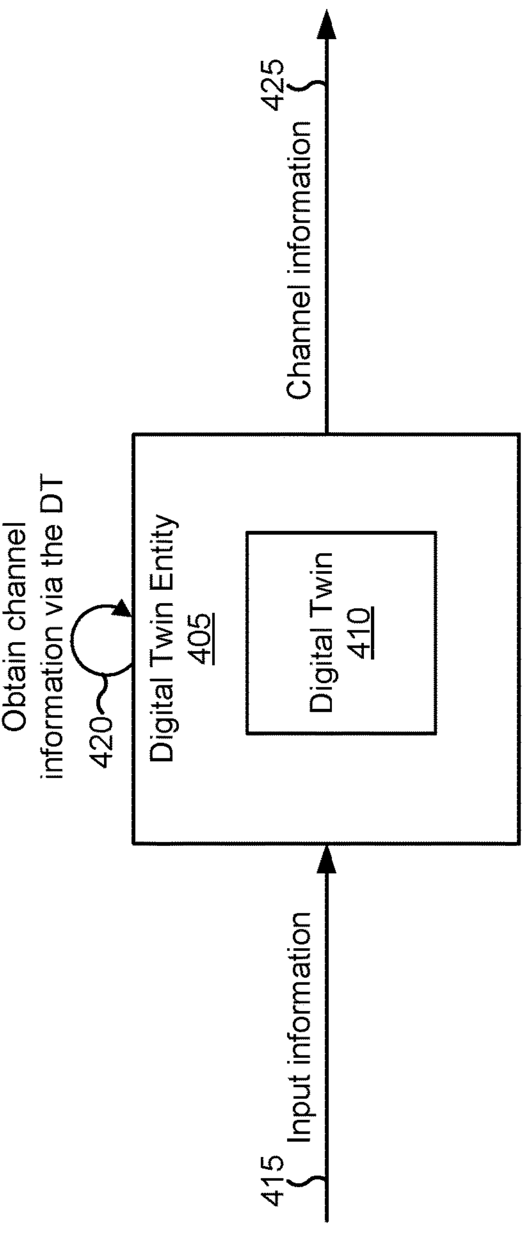
FIG. 4 is a diagram illustrating an example of digital twin (DT) operations in accordance with the present disclosure.

FIG. 4 is a diagram illustrating an example of DT operations 400 in accordance with the present disclosure. As shown in FIG. 4, a DT entity 405 may be configured to access a DT 410. For example, the DT entity 405 may store the DT 410. As another example, the DT entity 405 may be configured to access a storage location in which the DT 410 is stored. The DT 410 may be a digital or virtual representation of a physical operating environment for a wireless communication network, such as the wireless communication network 100 (e.g., where the physical operating environment is a physical twin corresponding to the DT 410).

For example, the DT 410 may be an information set including information regarding a network deployment and properties associated with the network deployment. For example, the DT 410 may be representative of an area (e.g., a geographic area), such as one or more cells, a sub-cell (e.g., a part of a cell, a subset of a coverage area of a cell), and/or an environment, among other examples. A sub-cell may be referred to herein as a part of a cell. The DT 410 may include a representation of one or more radio emitters (such as a location of a radio emitter, a physical configuration of the radio emitter, and/or a radio configuration of the radio emitter), one or more objects (such as geometry of the one or more objects and/or physical properties of the one or more objects, including reflection or absorption properties), a geographical layout, and/or a channel (such as propagation properties of the channel, including signal attenuation), among other examples. The DT 410 may be a virtual representation of a real-world physical system or product (e.g., a physical twin) that serves as a digital counterpart for one or more purposes, such as planning, operational simulation, integration, testing, monitoring, and/or maintenance, among other examples.

For example, the DT 410 may represent a full lifecycle of a physical network process, such as using a physical model, sensor information, operational history, and/or other data. The DT 410 may be consistent with physical network elements and topology of a cell or sub-cell represented by the DT 410. The DT 410 may be a digital representation of a physical environment associated with one or more cells (e.g., covering an outdoor environment and/or an indoor environment). For example, the DT 410 may include a digital model or representation of a geographic area. The DT 410 may be, or may include, a three-dimensional digital model of a physical operating environment. The DT 410 may represent a physical environment, such as a coverage area of one or more cells, a building, a factory, a city, and/or a neighborhood, among other examples.

The DT 410 (e.g., a three-dimensional digital model of a physical operating environment) may be generated using sensor data and/or other data. For example, the physical operating environment may be scanned to generate the sensor data (e.g., such as via light detection and ranging (LiDAR) sensing, radar sensing, RF sensing, camera sensing, and/or another type of sensing). The sensor data may be used to detect and/or localize one or more objects in the physical operating environment (e.g., buildings, bridges, trees, and/or other objects). A three-dimensional digital model of the physical operating environment may be generated using the sensor data and/or other data.

In some examples, the DT 410 can be used in conjunction with a channel model, such as a generative channel model (GCM), to model network performance in an area represented by the DT 410. A channel model is a model that receives, as input, observations or measurements regarding a channel or environment, and outputs channel information regarding the channel or environment. Examples of channel models include a tapped delay line (TDL) model (in which each tap of a channel is modeled with different delays via random variables) and a clustered delay line (CDL) model (in which taps are replaced by clusters to capture spatial characteristics of a channel). Another form of channel model is a GCM. A GCM is a channel model trained using a machine learning algorithm, such as a generative modeling algorithm (e.g., which may generate a generative adversarial network model). Generative modeling is a machine learning task (e.g., an unsupervised learning task) that may involve automatically discovering and learning the regularities or patterns in input data in such a way that the model can be used to generate or output new examples that plausibly could have been drawn from the original dataset. A GCM can be employed with the DT 410. For example, a GCM may receive a digital twin or information extracted from the DT 410 as input (e.g., in addition to a seed value). The GCM may output channel information specific to the digital twin, which may be considered site-specific propagation channels corresponding to the DT 410 or an area represented by the DT 410. By sampling (e.g., outputting) site-specific propagation channels for various locations represented by the digital twin, signal propagation and other properties for a cell or sub-cell can be modeled.

As shown by reference number 415, the DT entity 405 may obtain input information. The input information may be information to be used to obtain an output via the DT 410. For example, the input information may be associated with one or more devices or entities operating in a physical (e.g., real-world) environment. The input information may be associated with one or more wireless communication devices that are configured to communicate via a wireless communication network that is deployed in a physical operating environment (e.g., the physical operating environment represented or modeled via the DT 410).

As shown by reference number 420, the DT entity 405 may obtain channel information via the DT 410. For example, the DT entity 405 may use the input information to model or analyze a communication channel between two or more wireless communication devices in the digital representation of the physical operating environment that is modeled by the DT 410. For example, the DT 410 and/or the DT entity 405 may use one or more techniques to represent wireless communication channels (such as propagation properties of respective wireless communication channels) via the three-dimensional model of the physical operating environment. For example, the DT 410 and/or the DT entity 405 may use ray tracing to simulate or model how RF signals would interact with the physical operating environment. For example, in wireless communication, the physical operating environment may impact RF signal propagation (e.g., by blocking, deflecting, refracting, or otherwise impacting the RF signals). The DT 410 may model objects in the physical operating environment as reflective and/or refractive objects (e.g., depending on characteristics associated with the objects). The DT 410 may simulate or model paths that an RF signal may take as the RF signal propagates through the physical operating environment. The paths may include a direct path between a transmitting device and a receiving device and one or more reflected, diffracted, and/or scattered paths. By tracing these paths, the DT 410 may provide insights into signal strength, multipath effects, and/or other propagation characteristics of wireless communication channels. Additionally, the DT 410 may simulate or model multipath propagation in the wireless communication network by tracing multiple rays and accounting for the different propagation paths and respective delays, attenuations, and/or phases. This multipath propagation information May improve an understanding of signal degradation, fading, and/or interference in the wireless communication network.

As shown by reference number 425, the DT entity 405 may output the channel information obtained via the DT 410. For example, the DT entity 405 may transmit the channel information to a wireless communication device that is operating in the wireless communication network (e.g., in the physical operating environment). For example, the DT entity 405 may transmit, and a network node 110 or a UE 120 may receive, the channel information. Additionally, or alternatively, the DT entity 405 may output the channel information to a core network function or service.

By using the channel information obtained via the DT 410, a performance and/or resource utilization efficiency of wireless communications in the physical operating environment may be improved. For example, a wireless communication device may use the channel information to improve one or more communication parameters (e.g., spatial domain information (e.g., a beam), frequency domain resources, bandwidth, bandwidth size, MCS, transmit power, and/or another communication parameter) used for one or more wireless communications in the wireless communication network. This may conserve network resources (e.g., time domain resources and/or frequency domain resources), processing resources, power resources (e.g., device energy or battery), and/or memory resources, among other examples, that would have otherwise been associated with transmitting, receiving, processing, and/or measuring, among other examples, one or more signals (e.g., reference signals) to determine values for the one or more communication parameters. Additionally, this may reduce latency for data being transmitted between wireless communication devices that would have otherwise been associated with transmitting, receiving, processing, and/or measuring, among other examples, one or more signals (e.g., reference signals) to determine values for the one or more communication parameters.

For example, a wireless communication device may use the channel information to select a best spatial direction (e.g., a best beam or beam pair) to use for communications with another wireless communication device (e.g., without having to transmit, receive, process, and/or measure, among other examples, one or more signals over a set of spatial directions to determine the best spatial direction). For example, typically, a network node 110 and a UE 120 may perform one or more beam management procedures to identify, select, and/or refine a beam or beam pair to be used for communications between the network node 110 and the UE 120. For example, the network node 110 and the UE 120 may perform a first beam management procedure (e.g., a P1 beam management procedure, a beam selection procedure, an initial beam acquisition procedure, a beam sweeping procedure, a cell search procedure, and/or a beam search procedure), a second beam management procedure (e.g., a P2 beam management procedure, a beam refinement procedure, a network node beam refinement procedure, a TRP beam refinement procedure, and/or a transmit beam refinement procedure), and a third beam management procedure (e.g., a P3 beam management procedure, a beam refinement procedure, a UE beam refinement procedure, and/or a receive beam refinement procedure) to identify, select, and/or refine a beam or beam pair to be used for communications between the network node 110 and the UE 120. Each beam management procedure may include the network node 110 and/or the UE 120 performing beam sweeping over multiple transmit (Tx) beams (e.g., transmit a signal (e.g., a synchronization signal block (SSB) or CSI reference signal (CSI-RS)) using each transmit beam for beam management. As a result, beam management may be network resource intensive, may consume significant power resources, and/or may introduce delays or latency in data communications between the network node 110 and the UE 120, among other examples. The channel information obtained via the DT 410 may be used to improve the efficiency of the beam management procedure(s) (e.g., by indicating a best beam or beam pair and/or enabling the network node 110 and/or the UE 120 to reduce the quantity of beams used for the beam management procedure(s)).

However, the DT entity 405 (and/or the DT 410) may not have access to reliable, accurate, and/or up-to-date input information to enable the DT 410 to obtain accurate channel information. For example, wireless communication devices (e.g., UEs) may be mobile devices that may change physical locations within the physical operating environment. The DT entity 405 (and/or the DT 410) may not have access to up-to-date location information for wireless communication devices within the physical operating environment, reducing the relevance and/or applicability of the channel information obtained via the DT 410. Additionally, different wireless communication devices may have different beamforming capabilities. For example, different wireless communication devices may be capable of communicating using different quantities of beams, different shapes of beams (such as the amplitude, width, and/or presence of side lobes) and/or different directions of beams, among other examples. Using an incorrect or inaccurate beamforming capability of a wireless communication device when obtaining the channel information via the DT 410 may result in inaccurate, irrelevant, or inapplicable channel information.

Figure 5:
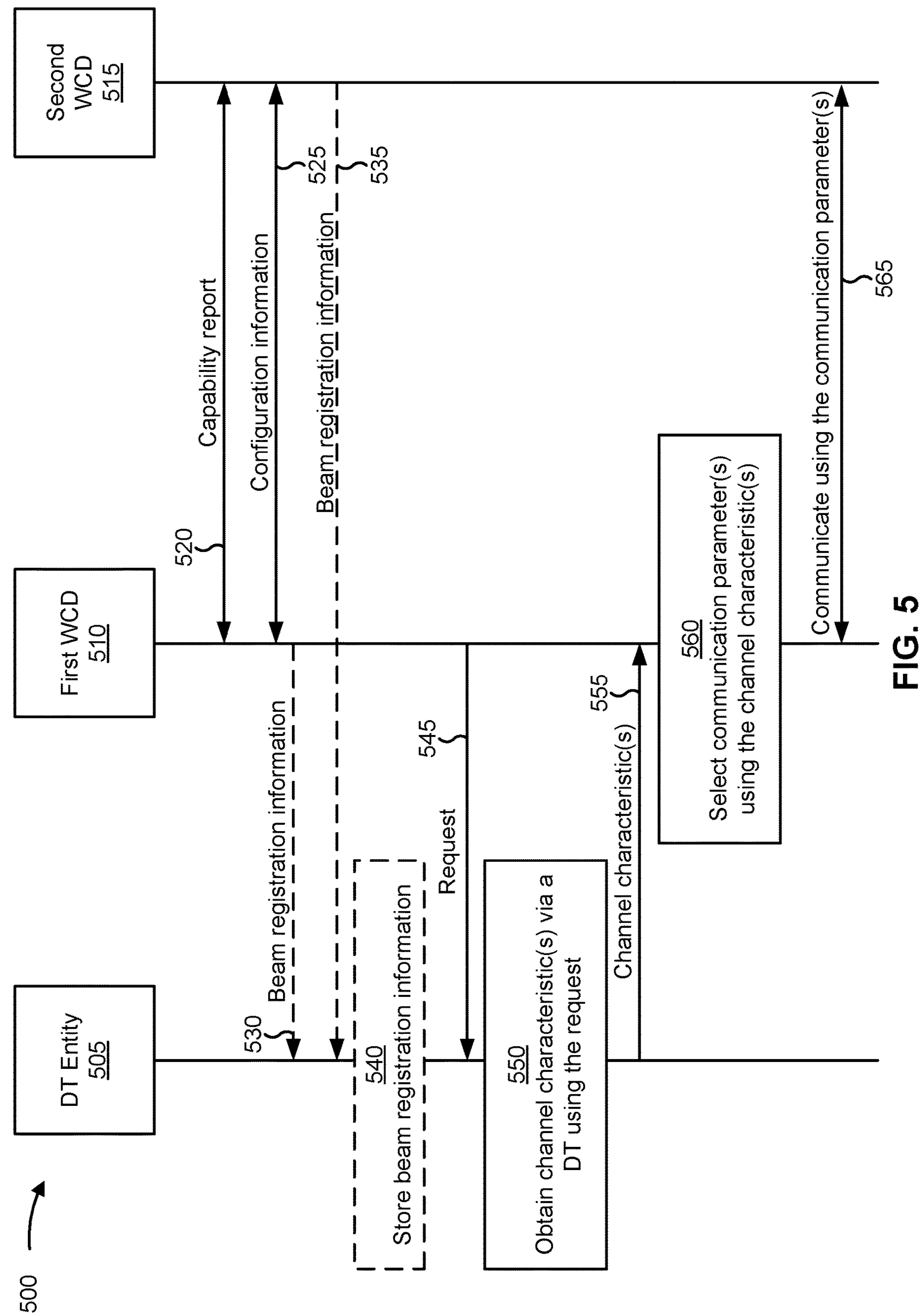
FIG. 5 is a diagram of an example associated with DT based beam management in accordance with the present disclosure.

FIG. 5 is a diagram of an example 500 associated with DT based beam management in accordance with the present disclosure. As shown in FIG. 5, a DT entity 505 (e.g., the DT entity 160 or the DT entity 405), a first wireless communication device (WCD) 510 (e.g., a network node 110 (e.g., a base station, a CU, a DU, and/or an RU) or a UE 120), and a second WCD 515 (e.g., a network node 110 (e.g., a base station, a CU, a DU, and/or an RU) or a UE 120) may communicate with each other. In some aspects, the DT entity 505, the first WCD 510, and/or the second WCD 515 may be part of a wireless communication network (e.g., the wireless communication network 100). The first WCD 510 and the second WCD 515 may have established a wireless connection prior to operations shown in FIG. 5. In some aspects, the first WCD 510 may be a network node 110 and the second WCD 515 may be a UE 120. In other aspects, the first WCD 510 may be a UE 120 and the second WCD 515 may be a network node 110. In other aspects, the first WCD 510 may be a first UE 120 and the second WCD 515 may be a second UE 120.

The DT entity 505 may be configured to access a DT, as described in more detail elsewhere herein. The DT may be associated with a physical operating environment of the first WCD 510 and the second WCD 515. For example, the DT may include a three-dimensional model of the physical operating environment. In some aspects, the DT entity 505 may be associated with a geographical area (e.g., one or more cells, one or more sub-cells, a city, a campus, a building, a factory, or another geographic area). The first WCD 510 and the second WCD 515 may be deployed in (or may be currently operating in) the geographical area. The first WCD 510 and/or the second WCD 515 may be configured to communicate with the DT entity 505 to obtain information generated via the DT.

In some aspects, as shown by reference number 520, the first WCD 510 and the second WCD 515 may exchange one or more capability reports. For example, the second WCD 515 may transmit, and the first WCD 510 may receive, a capability report (such as when the second WCD 515 is a UE 120). Additionally, or alternatively, the first WCD 510 may transmit, and the second WCD 515 may receive, a capability report (such as when the first WCD 510 is a UE 120).

The first WCD 510 and/or the second WCD 515 may transmit a capability report via an uplink communication, a UE assistance information (UAI) communication, an uplink control information (UCI) communication, an uplink MAC control element (MAC-CE) communication, an RRC communication, a PUCCH, and/or a PUSCH, among other examples. The capability report may indicate one or more parameters associated with respective capabilities of the first WCD 510 and/or the second WCD 515. The one or more parameters may be indicated via respective information elements (IEs) included in the capability report.

The capability report may indicate whether the first WCD 510 and the second WCD 515 support a feature and/or one or more parameters related to the feature. For example, the capability report may indicate a capability and/or parameter for supporting DT based beam management. As another example, the capability report may indicate a capability and/or parameter for supporting beam registration with a DT entity 505. One or more operations described herein may be based on capability information of the capabilities report. For example, the first WCD 510 and/or the second WCD 515 may perform a communication in accordance with the capability information, or may receive configuration information that is in accordance with the capability information. In some aspects, a capability report may indicate support for transmitting a request for channel characteristics to the DT entity 505 and/or support for receiving (and/or using) channel characteristics received from the DT entity 505. Additionally, or alternatively, a capability report may indicate support for transmitting, to the DT entity 505, beam information for respective beams associated with a given WCD (e.g., the first WCD 510 or the second WCD 515).

In some aspects, as shown by reference number 525, the first WCD 510 and the second WCD 515 may exchange configuration information. For example, the first WCD 510 may transmit, and the second WCD 515 may receive, configuration information (such as when the first WCD 510 is a network node 110). Additionally, or alternatively, the second WCD 515 may transmit, and the first WCD 510 may receive, configuration information (such as when the second WCD 515 is a network node 110).

In some aspects, the first WCD 510 and/or the second WCD 515 may receive the configuration information via one or more of system information signaling (e.g., a master information block (MIB) and/or a system information block (SIB), among other examples), RRC signaling, MAC signaling (e.g., one or more MAC-CEs), and/or downlink control information (DCI) signaling, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may indicate that the first WCD 510 and the second WCD 515 are to perform DT based beam management, as described herein. For example, the configuration information may indicate that the first WCD 510 and the second WCD 515 are to transmit, to the DT entity 505, one or more requests for channel characteristics to be used for beam management. In some aspects, the configuration information may indicate information associated with (or may identify) the DT entity 505 to be used for the DT based beam management. For example, the configuration information may include an identifier or an address (e.g., a communication address) of the DT entity 505.

In some aspects, the configuration information may indicate that the first WCD 510 and the second WCD 515 are to perform a beam registration operation with the DT entity 505. For example, the configuration information may indicate that the first WCD 510 and the second WCD 515 are to transmit beam information for one or more beams associated with the first WCD 510 and the second WCD 515. The beam information may indicate a quantity of beams, a shape of respective beams, and/or a spatial direction of beams, among other examples.

The first WCD 510 and/or the second WCD 515 may configure itself based at least in part on the configuration information. In some aspects, the first WCD 510 and/or the second WCD 515 may be configured to perform one or more operations described herein based at least in part on the configuration information.

In some aspects, the configuration information described herein and/or the capability report(s) described herein may include information transmitted via multiple communications. Additionally, or alternatively, a WCD (e.g., the first WCD 510 or the second WCD 515) may transmit configuration information, or a communication including at least a portion of configuration information, before and/or after the other WCD (e.g., the first WCD 510 or the second WCD 515) transmits a capability report. For example, a WCD may transmit a first portion of the configuration information before another WCD transmits a capability report, the other WCD may transmit at least a portion of the capability report, and the WCD may transmit a second portion of the configuration information after receiving the capability report.

In some aspects, as shown by reference number 530, the first WCD 510 may transmit, and the DT entity 505 may receive, beam registration information associated with the first WCD 510. In some aspects, the beam registration information may indicate information associated with one or more beams that are associated with the first WCD 510 (or one or more TRPs associated with the first WCD 510). A beam may be associated with a WCD in that the WCD (or a TRP managed by or configured by the WCD) is capable of forming and/or communicating (e.g., transmitting and/or receiving) via the beam. The beam registration information may indicate beam information for respective beams of one or more beams associated with the first WCD 510. The one or more beams may include SSB beams (e.g., beams via which the first WCD 510 is capable of transmitting or receiving, or configured to transmit or receive, SSBs), CSI-RS beams (e.g., beams via which the first WCD 510 is capable of transmitting or receiving, or configured to transmit or receive, CSI-RSs), reference signal beams (e.g., beams via which the first WCD 510 is capable of transmitting or receiving, or configured to transmit or receive, one or more downlink reference signals or uplink reference signals), and/or other types of beams.

The beam information (e.g., indicated by the beam registration information) may include one or more beam parameters for respective beams. The one or more beam parameters may include a shape (e.g., amplitude, width, and/or presence side lobes), a spatial direction, and/or other beam parameters. In some aspects, the beam information may indicate a quantity of the one or more beams. In some aspects, the beam registration information may indicate identifiers for respective beams of the one or more beams associated with the first WCD 510. For example, the one or more beams may be associated with respective identifiers (e.g., unique beam identifiers). The beam identifier(s) may be generated by the first WCD 510. Alternatively, the beam identifier(s) may be generated by the DT entity 505 (e.g., and transmitted to the first WCD 510 and/or the second WCD 515).

In some aspects, a beam identifier may include cell information associated with a cell in which the first WCD 510 is configured to operate. Additionally, or alternatively, a beam identifier may include reference signal information associated with a reference signal that is configured to be transmitted via the beam corresponding to the beam identifier. For example, a beam identifier may indicate a quantity of SSB beams and an SSB position in an SSB burst corresponding to the beam identified by the beam identifier. In some examples, a beam identifier may indicate a cell identifier, the quantity of SSB beams, and the SSB position in the SSB burst (e.g., in a tuple), such as when the beam is associated with a network node 110 and is an SSB beam. As another example, a beam identifier may indicate a cell identifier and a CSI-RS resource identifier (or index) or CSI-RS resource set identifier of a CSI-RS that is configured to be transmitted via the beam corresponding to the beam identifier, such as when the beam is associated with a network node 110 and is a CSI-RS beam. As another example, a beam identifier may include an indication or an identifier of the first WCD 510. For example, a beam identifier may include a UE identifier, such as a subscription permanent identifier (SUPI) (e.g., a UE 5G SUPI), among other examples.

In some aspects, as shown by reference number 535, the second WCD 515 may transmit, and the DT entity 505 may receive, beam registration information for one or more beams associated with the second WCD 515. The second WCD 515 may transmit the beam registration information in a similar manner as described above (e.g., in connection with reference number 530).

In some aspects, the first WCD 510 may transmit, and the second WCD 515 may receive, an indication to register one or more beams with the DT entity 505. For example, the first WCD 510 may determine that DT based beam management for a communication link between the first WCD 510 and the second WCD 515 is to be performed. To facilitate the DT based beam management, the first WCD 510 may cause the second WCD 515 to register (e.g., to transmit an indication of) beam information for one or more beams that the second WCD 515 is capable of forming with the DT entity 505.

As shown by reference number 540, the DT entity 505 may store the beam registration information for respective WCDs. For example, the DT entity 505 may store beam registration information for the first WCD 510, beam registration information for the second WCD 515, and/or beam registration information associated with other WCDs operating in a geographic area associated with the DT entity 505. For example, the DT entity 505 may store beam identifiers for the beam registration information to enable the DT entity 505 to access beam registration information associated with one or more beam identifiers indicated by a request for channel characteristics, as described in more detail herein.

For example, network nodes 110 and/or UEs 120 operating in the wireless communication network may register beams with the DT entity 505. For example, a network node 110 may register one or more beams associated with a TRP of the network node 110 (e.g., one or more TRP beams or one or more RU beams). If a UE 120 is capable of performing beamforming, then the UE 120 may register one or more UE beams with the DT entity 505. As described elsewhere herein, this may improve the efficiency of an operation for requesting and/or receiving channel characteristics from the DT entity 505. For example, a request for channel characteristics described herein may include a field or IE for indicating beam identifiers. The DT entity 505 may obtain a beam identifier via the field or IE in the request. The DT entity 505 may obtain beam information corresponding to a beam that is associated with the beam identifier (e.g., via the beam registration information stored by the DT entity 505). This reduces a signaling overhead, conserves network resources (e.g., by reducing a size of the request), and/or improves the efficiency of requesting channel characteristics from the DT entity 505, among other examples, that would have otherwise been associated with indicating the beam information in the request.

As shown by reference number 545, the first WCD 510 may transmit, and the DT entity 505 may receive, a request for channel characteristics. The request for channel characteristics may be for a communication link associated with the second WCD 515. For example, the communication link may be between the first WCD 510 and the second WCD 515. As another example, the communication link may be between a TRP or RU of the first WCD 510 and the second WCD 515. As another example, the communication link may be between the first WCD 510 and a TRP or RU of the second WCD 515.

The request may indicate request information. For example, the request may include one or more fields or IEs for respective request information. In some aspects, the request may indicate one or more requested channel characteristics for the communication link. The one or more request channel characteristics may include one or more dominant propagation directions, one or more beams (e.g., of the first WCD 510 and/or the second WCD 515), one or more beam pairs (e.g., where a beam pair include a beam associated with the first WCD 510 and a beam associated with the second WCD 515), spatial domain information associated with the communication link, and/or one or more channel parameters, among other examples. "Dominant propagation path" may refer to a primary path that a signal takes between the first WCD 510 and the second WCD 515. The dominant propagation path may be a strongest or most significant signal path among all possible propagation paths between the first WCD 510 and the second WCD 515. The one or more beams, beam pairs, and/or spatial domain information may be associated with the dominant propagation path for the communication link. For example, a requested channel characteristic may be a spatial direction in which communications should be transmitted via the communication link to result in the best performance of the communications. In some aspects, a requested channel characteristic may be a top (e.g., best or having a strongest signal parameter among all available or possible beams or beam pairs, such as signal strength or signal quality) K beams or K beam pairs for the communication link. Additionally, or alternatively, the one or more requested channel characteristics may include other communication parameters or characteristics, such as a path loss, a delay spread, a Doppler spread, a channel capacity, and/or a multipath fading characteristic, among other examples.

In some aspects, the request may include location information associated with the first WCD 510 (and/or of a TRP or RU associated with the first WCD 510) and/or location information associated with the second WCD 515 (e.g., and/or of a TRP or RU associated with the second WCD 515). For example, the request information may include first location information associated with the first WCD 510. The first location information may indicate a geographic location of the first WCD 510 (and/or of a TRP or RU associated with the first WCD 510). For example, the first location information may indicate a UE location (e.g., if the first WCD 510 is a UE 120) or one or more TRP locations (e.g., if the first WCD 510 is a network node 110). Additionally, or alternatively, the first location information may indicate an orientation of the first WCD 510 (and/or of a TRP or RU associated with the first WCD 510). The orientation may indicate a spatial direction in which one or more antennas, antenna modules, and/or radio emitters, among other examples, are directed.

For example, a UE 120 may obtain location information and/or an orientation of the UE 120 via one or more positioning operations (e.g., that use RAT resources or that do not use RAT resources). For example, the UE 120 may obtain location information and/or an orientation of the UE 120 via a downlink time difference of arrival (TDOA) positioning operation. As another example, the UE 120 may obtain location information and/or an orientation of the UE 120 via a GNSS. As another example, the UE 120 may obtain location information and/or an orientation of the UE 120 via a wireless local area network (WLAN) positioning operation. As another example, the UE 120 may obtain location information and/or an orientation of the UE 120 via one or more sensors, such as an inertial measurement unit (IMU) and/or another type of sensor.

In some aspects, the request may indicate second location information associated with the second WCD 515. The second location information may indicate similar types of information as the first location information, but applicable to the second WCD 515. The first WCD 510 may obtain location information associated with the second WCD 515 (e.g., via a positioning procedure or via a communication received from the second WCD 515). The first WCD 510 may indicate the location information associated with the second WCD 515 in the request. Alternatively, the second WCD 515 may transmit, and the DT entity 505 may receive, the second location information associated with the second WCD 515.

In some aspects, the request may indicate timing information applicable to the request for channel characteristics. For example, the timing information may indicate a time (or time period) for which the one or more channel characteristics are requested. The request may indicate a requested time. The requested time may be a time for which the channel characteristics are requested. In some aspects, the requested time may be a point in time in the future. In such examples, the requested channel characteristics may be predicted channel characteristics for the point in time in the future.

In some aspects, the request may indicate beam information associated with the first WCD 510. The beam information may be similar to the beam information described elsewhere herein, such as in connection with beam registration (e.g., such as described in connection with reference number 530 and/or reference number 535). For example, the request may include TRP beam descriptions and/or UE beam descriptions. In some aspects, the request may include beam information associated with the second WCD 515. In some aspects, UE beam information may not be available. In such examples, the DT entity 505 and the first WCD 510 (or the second WCD 515) may determine that the UE uses a canonical beam shape (e.g., an omnidirectional antenna or beam). The beam information may enable high-fidelity processing by the DT entity 505, improving the output channel characteristics by the DT. In some aspects, the request may indicate the beam information by indicating one or more identifiers, from identifiers of one or more beams established during beam registration (e.g., such as described in connection with reference number 530 and/or reference number 535), to indicate which of the one or more beams are associated with the request.

In some aspects, the request may indicate a requested periodicity for periodic responses to the request. For example, the first WCD 510 may request a periodic response from the DT entity 505 (e.g., a response that is transmitted to the first WCD 510 periodically or in accordance with a periodic schedule). This may cause the DT entity 505 to provide one or more responses to the request in accordance with the timing and/or periodicity indicated by the request.

In some aspects, the request may indicate one or more trigger events associated with the request. A trigger event may be an event that causes the DT entity 505 to transmit a response to the request, as described herein. The one or more trigger events may include a change in one or more channel parameters satisfying respective thresholds. The one or more channel parameters may include a delay spread, a Doppler spread, a path loss, or another channel parameter or characteristic. In some aspects, the request may indicate one or more values of respective thresholds to be used to evaluate the trigger condition(s). Indicating the one or more trigger events in the request may cause the DT entity 505 to transmit a response to the request based on, in response to, or otherwise associated with an occurrence of a trigger event from the one or more trigger events.

In some aspects, the request may indicate one or more requested carrier frequencies and respective bandwidths to be associated with the channel characteristics. For example, the request may include target frequencies and corresponding bandwidths. For example, the first WCD 510 may request one or more channel characteristics for a carrier frequency of M GHz and a bandwidth of N MHz. Additionally, or alternatively, the first WCD 510 may request one or more channel characteristics for a carrier frequency of L GHz and a bandwidth of P MHz.

As shown by reference number 550, the DT entity 505 may obtain one or more channel characteristics for the communication link via the DT and using the request. For example, the DT entity 505 may use the request information as input information to be provided to the DT and/or to configure the DT. For example, the DT entity 505 may simulate or estimate one or more channel characteristics via the DT in accordance with the request provided by the first WCD 510. For example, the DT entity 505 may use beam information, location information, and/or other request information to estimate the one or more (requested) channel characteristics using the DT (e.g., using the DT to simulate or model the physical operating environment of the first WCD 510 and the second WCD 515). An output of the DT may be one or more channel characteristics.

For example, the DT may output one or more (or all) of the requested channel characteristics. In some examples, the DT (or the DT entity 505) may be unable to obtain one or more of the requested channel characteristics. For example, the request may provide insufficient information (or the DT entity 505 may have access to insufficient information) to enable the DT entity 505 to estimate the one or more of the requested channel characteristics via the DT. In such examples, the DT entity 505 may generate an error response to the request. The error response may indicate one or more reasons for the error and/or the inability to estimate the one or more of the requested channel characteristics.

In some examples, the one or more channel characteristics output by the DT may be associated with a downlink channel of the communication link. In other aspects, the one or more channel characteristics output by the DT may be associated with an uplink channel of the communication link.

As shown by reference number 555, the DT entity 505 may transmit, and the first WCD 510 may receive, a response to the request. The response may indicate the one or more channel characteristics for the communication link that are associated with the three-dimensional digital model. The one or more channel characteristics may be associated with the three-dimensional digital model in that the one or more channel characteristics may be estimated using the three-dimensional digital model of the DT. In some aspects, the DT entity 505 may transmit the response in accordance with a periodic schedule indicated by the request. Additionally, or alternatively, the DT entity 505 may transmit the response based on, in response to, or otherwise associated with detecting a trigger event. For example, the DT entity 505 may obtain information associated with the wireless communication network (e.g., via the first WCD 510, via a core network function, or via another device). The DT entity 505 may detect a trigger event based on, in response to, or otherwise associated with determining that a value of a communication characteristic satisfies (or does not satisfy) a threshold.

In some aspects, the response may indicate a validity time period. The validity time period may be a time period during which the one or more channel characteristics are valid. For example, the physical operating environment may be a dynamic environment in which devices and/or objects are moving, changing locations, and/or changing orientations, among other examples. Therefore, the DT entity 505 may indicate the validity time period (e.g., a time validity window) during which the provided information (e.g., the one or more channel characteristics) can be considered accurate.

In some examples, the DT entity 505 may maintain an updated DT of the physical operating environment. For example, the DT entity 505 may obtain updated information (e.g., indicating changes in the physical operating environment) and may update the DT accordingly. In some aspects, the first WCD 510 may request updated (and/or up-to-date) channel characteristic estimations from the DT entity 505. For example, the DT entity 505 may provide the response based on, in response to, or otherwise associated with updating or modifying the DT of the physical operating environment.

As shown by reference number 560, the first WCD 510 may select one or more communication parameters using the one or more channel characteristics indicated by the response. For example, the first WCD 510 may select or determine spatial domain information (e.g., one or more beams or beam pairs) to be used to communicate with the second WCD 515 using the one or more channel characteristics indicated by the response. Additionally, or alternatively, the first WCD 510 may select or determine a transmit power, an MCS, and/or another communication parameter using the one or more channel characteristics indicated by the response.

As shown by reference number 565, the first WCD 510 and the second WCD 515 may communicate in association with the one or more channel characteristics. The communication may be one or more channel characteristics indicated by the responses in that the communication may use the one or more communication parameters that are selected or determined using the one or more channel characteristics. For example, the first WCD 510 and the second WCD 515 may communicate using one or more beams or one or more beam pairs indicated by the response.

In some aspects, the first WCD 510 may transmit, and the second WCD 515 may receive, an indication of the one or more communication parameters. For example, the first WCD 510 may transmit, and the second WCD 515 may receive, spatial domain information to be used by the first WCD 510 that is selected in accordance with the one or more channel characteristics, as described herein.

As an example, the one or more channel characteristics may include estimated signal parameters (e.g., an estimated RSRP, an estimated RSRQ, or another estimated signal parameter) for respective spatial directions, respective beams, and/or respective beam pairs. The estimated signal parameters may be estimations of what would be expected to be measured at the second WCD 515 if the first WCD 510 were to transmit using the respective spatial directions, respective beams, and/or respective beam pairs. The first WCD 510 may rank or refine one or more beams using the estimated signal parameters (e.g., ranking the one or more beams using the estimated signal parameters). The first WCD 510 may select at least one beam from the one or more beams based on, or otherwise associated with, the ranking or order of beams (e.g., that is in accordance with the estimated signal parameters). The first WCD 510 may transmit one or more communications or messages to the second WCD 515 using the at least one beam.

As an example, the one or more communications or messages may include paging information. In such examples, the first WCD 510 may not have an accurate indication of a location of the second WCD 515. Therefore, the first WCD 510 may transmit, via one or more beams indicated by the response, paging information associated with the second WCD 515. This may reduce the quantity of beams via which the paging information is transmitted, thereby conserving network resources and/or power resources of the first WCD 510 that would have otherwise been associated with transmitting the paging information using additional beams (e.g., because the first WCD 510 does not know the location of the second WCD 515). Additionally, this may reduce latency associated with data communications (e.g., to be communicated as indicated by the paging information) that would have otherwise been associated with transmitting the paging information using additional beams.

As another example, the first WCD 510 may transmit, and the second WCD 515 may receive, spatial domain information to be used by the first WCD 510 for beam failure recovery events. The spatial domain information may be selected in accordance with the one or more channel characteristics, as described elsewhere herein. For example, typically, a WCD (e.g., a UE 120) may measure and/or scan all SSB beams and/or all CSI-RS beams of another WCD (e.g., a network node 110) based on, or in response to, detecting a beam failure. Based on the location of the second WCD 515 and using the one or more channel characteristics obtained via the DT, the first WCD 510 may obtain an indication of, or determine, spatial directions (e.g., beams or beam pairs) that are expected to be associated with the best performance for the communication link between the first WCD 510 and the second WCD 515. Therefore, the first WCD 510 may transmit, and the second WCD 515 may receive, an indication (e.g., a configuration) of spatial domain information to be used by the first WCD 510 and/or by the second WCD 515 for beam failure recovery events. For example, the first WCD 510 may configure one or more (e.g., a top K) beams to be measured, monitored, or scanned by the second WCD 515 based on, in response to, or otherwise associated with an occurrence of a beam failure recover event.

The first WCD 510 may transmit, and the second WCD 515 may receive, one or more reference signals using the spatial domain information in association with an occurrence of a beam failure recovery event. This may reduce a latency associated with re-establishing a communication connection after the beam failure recovery event, thereby improving throughput for the communication link. Additionally, this may conserve network resources and/or power resources that would have otherwise been associated with transmitting the one or more reference signals using additional beams in association with an occurrence of a beam failure recovery event.

As indicated above, FIG. 5 is provided as an example. Other examples may differ from what is described with respect to FIG. 5.

FIG. 6 is a diagram illustrating an example process 600 performed, for example, at a first wireless communication device or an apparatus of a first wireless communication device, in accordance with the present disclosure. Example process 600 is an example where the apparatus or the first wireless communication device (e.g., the first WCD 510, a network node 110, or a UE 120) performs operations associated with DT based beam management.

As shown in FIG. 6, in some aspects, process 600 may include transmitting, to a DT entity, a request for channel characteristics of a communication link associated with a second wireless communication device, the DT entity being associated with a three-dimensional digital model of a physical operating environment associated with the first wireless communication device and the second wireless communication device (block 610). For example, the first wireless communication device (e.g., using transmission component 804 and/or communication manager 806, depicted in FIG. 8) may transmit, to a DT entity, a request for channel characteristics of a communication link associated with a second wireless communication device, the DT entity being associated with a three-dimensional digital model of a physical operating environment associated with the first wireless communication device and the second wireless communication device, as described above.

As further shown in FIG. 6, in some aspects, process 600 may include receiving, from the DT entity, a response indicating one or more channel characteristics for the communication link that are associated with the three-dimensional digital model (block 620). For example, the first wireless communication device (e.g., using reception component 802 and/or communication manager 806, depicted in FIG. 8) may receive, from the DT entity, a response indicating one or more channel characteristics for the communication link that are associated with the three-dimensional digital model, as described above.

As further shown in FIG. 6, in some aspects, process 600 may include communicating with the second wireless communication device in association with the one or more channel characteristics (block 630). For example, the first wireless communication device (e.g., using reception component 802, transmission component 804, and/or communication manager 806, depicted in FIG. 8) may communicate with the second wireless communication device in association with the one or more channel characteristics, as described above.

Process 600 may include additional aspects, such as any single aspect or any combination of aspects described below and/or in connection with one or more other processes described elsewhere herein.

In a first aspect, the communication link is between the second wireless communication device and a transmission reception point associated with the first wireless communication device.

In a second aspect, alone or in combination with the first aspect, the request indicates at least one of first location information associated with the first wireless communication device, or second location information associated with the second wireless communication device.

In a third aspect, alone or in combination with one or more of the first and second aspects, the request indicates timing information applicable to the request for channel characteristics, the one or more channel characteristics being associated with a time indicated by the timing information.

In a fourth aspect, alone or in combination with one or more of the first through third aspects, the request indicates beam information associated with the first wireless communication device.

In a fifth aspect, alone or in combination with one or more of the first through fourth aspects, the request indicates beam information associated with the second wireless communication device.

In a sixth aspect, alone or in combination with one or more of the first through fifth aspects, the request indicates a requested periodicity for periodic responses to the request.

In a seventh aspect, alone or in combination with one or more of the first through sixth aspects, receiving the response includes receiving, in accordance with the requested periodicity, one or more responses indicating respective sets of one or more channel characteristics for the communication link.

In an eighth aspect, alone or in combination with one or more of the first through seventh aspects, the request indicates one or more trigger events associated with the request.

In a ninth aspect, alone or in combination with one or more of the first through eighth aspects, receiving the response is in association with an occurrence of a trigger event of the one or more trigger events.

In a tenth aspect, alone or in combination with one or more of the first through ninth aspects, the one or more trigger events include a change in one or more channel parameters satisfying respective thresholds.

In an eleventh aspect, alone or in combination with one or more of the first through tenth aspects, the request indicates one or more requested channel characteristics.

In a twelfth aspect, alone or in combination with one or more of the first through eleventh aspects, the one or more requested channel characteristics include at least one of one or more dominant propagation directions, one or more beam pairs, spatial domain information associated with the communication link, or one or more channel parameters.

In a thirteenth aspect, alone or in combination with one or more of the first through twelfth aspects, the request indicates one or more requested carrier frequencies and respective bandwidths to be associated with the channel characteristics.

In a fourteenth aspect, alone or in combination with one or more of the first through thirteenth aspects, the one or more channel characteristics are associated with a downlink channel of the communication link.

In a fifteenth aspect, alone or in combination with one or more of the first through fourteenth aspects, the one or more channel characteristics are associated with an uplink channel of the communication link.

In a sixteenth aspect, alone or in combination with one or more of the first through fifteenth aspects, the response indicates a validity time period during which the one or more channel characteristics are valid.

In a seventeenth aspect, alone or in combination with one or more of the first through sixteenth aspects, process 600 includes transmitting, to the DT entity, beam registration information indicating beam information for respective beams of one or more beams associated with the first wireless communication device.

In an eighteenth aspect, alone or in combination with one or more of the first through seventeenth aspects, the one or more beams include at least one of: signal block beams, channeling state information reference signal beams, or downlinking reference signal beams.

In a nineteenth aspect, alone or in combination with one or more of the first through eighteenth aspects, the one or more beams are associated with respective identifiers, and the request indicates one or more identifiers, from the respective identifiers, to indicate which of the one or more beams are associated with the request.

In a twentieth aspect, alone or in combination with one or more of the first through nineteenth aspects, communicating with the second wireless communication device includes communicating using one or more beams or one or more beam pairs indicated by the response.

In a twenty-first aspect, alone or in combination with one or more of the first through twentieth aspects, communicating with the second wireless communication device includes transmitting, via one or more beams indicated by the response, paging information associated with the second wireless communication device.

In a twenty-second aspect, alone or in combination with one or more of the first through twenty-first aspects, process 600 includes transmitting, to the second wireless communication device, spatial domain information to be used by the first wireless communication device that is selected in accordance with the one or more channel characteristics.

In a twenty-third aspect, alone or in combination with one or more of the first through twenty-second aspects, communicating with the second wireless communication device includes transmitting, to the second wireless communication device, spatial domain information to be used by the first wireless communication device for beam failure recovery events, the spatial domain information being selected in accordance with the one or more channel characteristics, and transmitting, to the second wireless communication device, one or more reference signals using the spatial domain information in association with an occurrence of a beam failure recovery event.

In a twenty-fourth aspect, alone or in combination with one or more of the first through twenty-third aspects, the first wireless communication device is a network node and the second wireless communication device is a UE.

In a twenty-fifth aspect, alone or in combination with one or more of the first through twenty-fourth aspects, the first wireless communication device is a UE and the second wireless communication device is a network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, at a DT entity or an apparatus of a DT entity, in accordance with the present disclosure. Example process 700 is an example where the apparatus or the DT entity (e.g., DT entity 505 or DT entity 160) performs operations associated with DT based beam management.

As shown in FIG. 7, in some aspects, process 700 may include receiving, from a first wireless communication device, a request for channel characteristics of a communication link associated with a second wireless communication device, a three-dimensional digital model of a physical operating environment associated with the first wireless communication device and the second wireless communication device being accessible by the DT entity (block 710). For example, the DT entity (e.g., using reception component 902 and/or communication manager 906, depicted in FIG. 9) may receive, from a first wireless communication device, a request for channel characteristics of a communication link associated with a second wireless communication device, a three-dimensional digital model of a physical operating environment associated with the first wireless communication device and the second wireless communication device being accessible by the DT entity, as described above.

As further shown in FIG. 7, in some aspects, process 700 may include transmitting, to the first wireless communication device, a response indicating one or more channel characteristics for the communication link that are obtained via the three-dimensional digital model (block 720). For example, the DT entity (e.g., using transmission component 904 and/or communication manager 906, depicted in FIG. 9) may transmit, to the first wireless communication device, a response indicating one or more channel characteristics for the communication link that are obtained via the three-dimensional digital model, as described above.

Process 700 may include additional aspects, such as any single aspect or any combination of aspects described below and/or in connection with one or more other processes described elsewhere herein.

In a first aspect, the communication link is between the second wireless communication device and a transmission reception point associated with the first wireless communication device.

In a second aspect, alone or in combination with the first aspect, the request indicates at least one of first location information associated with the first wireless communication device, or second location information associated with the second wireless communication device.

In a third aspect, alone or in combination with one or more of the first and second aspects, the request indicates timing information applicable to the request for channel characteristics, the one or more channel characteristics being associated with a time indicated by the timing information.

In a fourth aspect, alone or in combination with one or more of the first through third aspects, the request indicates beam information associated with the first wireless communication device.

In a fifth aspect, alone or in combination with one or more of the first through fourth aspects, the request indicates beam information associated with the second wireless communication device.

In a sixth aspect, alone or in combination with one or more of the first through fifth aspects, the request indicates a requested periodicity for periodic responses to the request.

In a seventh aspect, alone or in combination with one or more of the first through sixth aspects, transmitting the response includes transmitting, in accordance with the requested periodicity, one or more responses indicating respective sets of one or more channel characteristics for the communication link.

In an eighth aspect, alone or in combination with one or more of the first through seventh aspects, the request indicates one or more trigger events associated with the request.

In a ninth aspect, alone or in combination with one or more of the first through eighth aspects, receiving the response is in association with an occurrence of a trigger event of the one or more trigger events.

In a tenth aspect, alone or in combination with one or more of the first through ninth aspects, the one or more trigger events include a change in one or more channel parameters satisfying respective thresholds.

In an eleventh aspect, alone or in combination with one or more of the first through tenth aspects, the request indicates one or more requested channel characteristics.

In a twelfth aspect, alone or in combination with one or more of the first through eleventh aspects, the one or more requested channel characteristics include at least one of one or more dominant propagation directions, one or more beam pairs, spatial domain information associated with the communication link, or one or more channel parameters.

In a thirteenth aspect, alone or in combination with one or more of the first through twelfth aspects, the request indicates one or more requested carrier frequencies and respective bandwidths to be associated with the channel characteristics.

In a fourteenth aspect, alone or in combination with one or more of the first through thirteenth aspects, the one or more channel characteristics are associated with a downlink channel of the communication link.

In a fifteenth aspect, alone or in combination with one or more of the first through fourteenth aspects, the one or more channel characteristics are associated with an uplink channel of the communication link.

In a sixteenth aspect, alone or in combination with one or more of the first through fifteenth aspects, the response indicates a validity time period during which the one or more channel characteristics are valid.

In a seventeenth aspect, alone or in combination with one or more of the first through sixteenth aspects, process 700 includes receiving, from the first wireless communication device, beam registration information indicating beam information for respective beams of one or more beams associated with the first wireless communication device.

In an eighteenth aspect, alone or in combination with one or more of the first through seventeenth aspects, the one or more beams include at least one of: signal block beams, channeling state information reference signal beams, or downlinking reference signal beams.

In a nineteenth aspect, alone or in combination with one or more of the first through eighteenth aspects, the one or more beams are associated with respective identifiers, and the request indicates one or more identifiers, from the respective identifiers, to indicate which of the one or more beams are associated with the request.

In a twentieth aspect, alone or in combination with one or more of the first through nineteenth aspects, process 700 includes receiving, from the second wireless communication device, beam registration information indicating beam information for respective beams of one or more beams associated with the second wireless communication device.

In a twenty-first aspect, alone or in combination with one or more of the first through twentieth aspects, the first wireless communication device is a network node and the second wireless communication device is a UE.

In a twenty-second aspect, alone or in combination with one or more of the first through twenty-first aspects, the first wireless communication device is a UE and the second wireless communication device is a network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
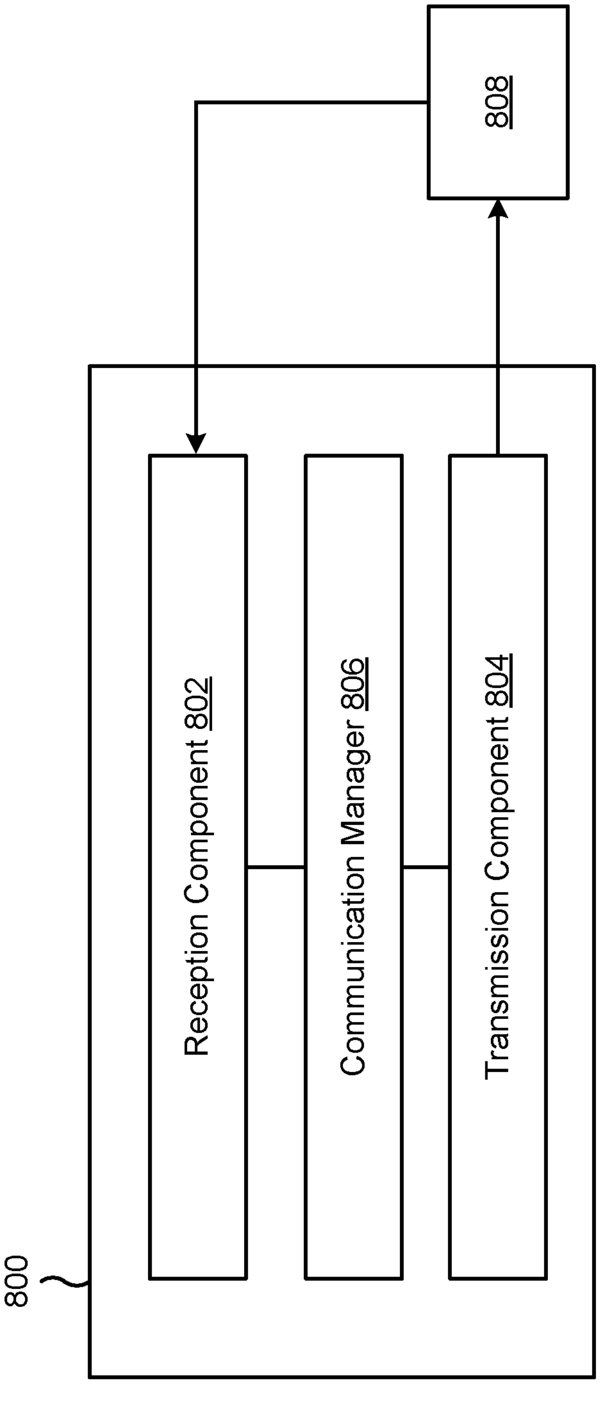
FIG. 8 is a diagram of an example apparatus for wireless communication in accordance with the present disclosure.

FIG. 8 is a diagram of an example apparatus 800 for wireless communication in accordance with the present disclosure. The apparatus 800 may be a wireless communication device, or a wireless communication device may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 or the communication manager 150 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE or network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the UE or network node described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the UE or network node described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit, to a DT entity, a request for channel characteristics of a communication link associated with a second wireless communication device, the DT entity being associated with a three-dimensional digital model of a physical operating environment associated with the apparatus 800 and the apparatus 808. The reception component 802 may receive, from the DT entity, a response indicating one or more channel characteristics for the communication link that are associated with the three-dimensional digital model. The reception component 802 and/or the transmission component 804 may communicate with the apparatus 808 in association with the one or more channel characteristics.

The transmission component 804 may transmit, to the DT entity, beam registration information indicating beam information for respective beams of one or more beams associated with the wireless communication device.

The transmission component 804 may transmit, to the apparatus 808, spatial domain information to be used by the apparatus 800 that is selected in accordance with the one or more channel characteristics.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
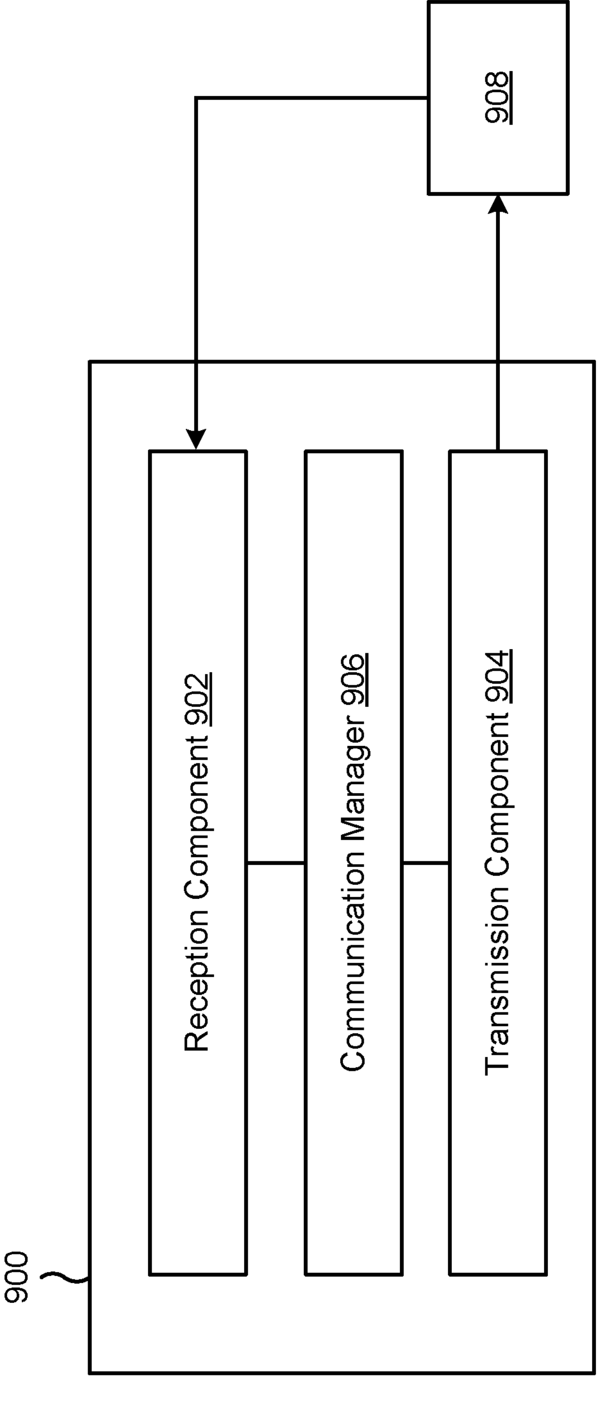
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a DT entity, or a DT entity may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 170 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a first wireless communication device, a request for channel characteristics of a communication link associated with a second wireless communication device, a three-dimensional digital model of a physical operating environment associated with the first wireless communication device and the second wireless communication device being accessible by the DT entity. The transmission component 904 may transmit, to the first wireless communication device, a response indicating one or more channel characteristics for the communication link that are obtained via the three-dimensional digital model. The communication manager 906 may obtain, via the DT (e.g., via the three-dimensional digital model) the one or more channel characteristics in association with the request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first wireless communication device, comprising: transmitting, to a digital twin (DT) entity, a request for channel characteristics of a communication link associated with a second wireless communication device, the DT entity being associated with a three-dimensional digital model of a physical operating environment associated with the first wireless communication device and the second wireless communication device; receiving, from the DT entity, a response indicating one or more channel characteristics for the communication link that are associated with the three-dimensional digital model; and communicating with the second wireless communication device in association with the one or more channel characteristics.

Aspect 2: The method of Aspect 1, wherein the communication link is between the second wireless communication device and a transmission reception point associated with the first wireless communication device.

Aspect 3: The method of any of Aspects 1-2, wherein the request indicates at least one of: first location information associated with the first wireless communication device, or second location information associated with the second wireless communication device.

Aspect 4: The method of any of Aspects 1-3, wherein the request indicates timing information applicable to the request for channel characteristics, the one or more channel characteristics being associated with a time indicated by the timing information.

Aspect 5: The method of any of Aspects 1-4, wherein the request indicates beam information associated with the first wireless communication device.

Aspect 6: The method of any of Aspects 1-5, wherein the request indicates beam information associated with the second wireless communication device.

Aspect 7: The method of any of Aspects 1-6, wherein the request indicates a requested periodicity for periodic responses to the request.

Aspect 8: The method of Aspect 7, wherein receiving the response comprises: receiving, in accordance with the requested periodicity, one or more responses indicating respective sets of one or more channel characteristics for the communication link.

Aspect 9: The method of any of Aspects 1-8, wherein the request indicates one or more trigger events associated with the request.

Aspect 10: The method of Aspect 9, wherein receiving the response is in association with an occurrence of a trigger event of the one or more trigger events.

Aspect 11: The method of any of Aspects 9-10, wherein the one or more trigger events include a change in one or more channel parameters satisfying respective thresholds.

Aspect 12: The method of any of Aspects 1-11, wherein the request indicates one or more requested channel characteristics.

Aspect 13: The method of Aspect 12, wherein the one or more requested channel characteristics include at least one of: one or more dominant propagation directions, one or more beam pairs, spatial domain information associated with the communication link, or one or more channel parameters.

Aspect 14: The method of any of Aspects 1-13, wherein the request indicates one or more requested carrier frequencies and respective bandwidths to be associated with the channel characteristics.

Aspect 15: The method of any of Aspects 1-14, wherein the one or more channel characteristics are associated with a downlink channel of the communication link.

Aspect 16: The method of any of Aspects 1-15, wherein the one or more channel characteristics are associated with an uplink channel of the communication link.

Aspect 17: The method of any of Aspects 1-16, wherein the response indicates a validity time period during which the one or more channel characteristics are valid.

Aspect 18: The method of any of Aspects 1-17, further comprising: transmitting, to the DT entity, beam registration information indicating beam information for respective beams of one or more beams associated with the first wireless communication device.

Aspect 19: The method of Aspect 18, wherein the one or more beams include at least one of: synchronization signal block beams, channel state information reference signal beams, or downlink reference signal beams.

Aspect 20: The method of any of Aspects 18-19, wherein the one or more beams are associated with respective identifiers, and wherein the request indicates one or more identifiers, from the respective identifiers, to indicate which of the one or more beams are associated with the request.

Aspect 21: The method of any of Aspects 1-20, wherein communicating with the second wireless communication device comprises: communicating using one or more beams or one or more beam pairs indicated by the response.

Aspect 22: The method of any of Aspects 1-21, wherein communicating with the second wireless communication device comprises: transmitting, via one or more beams indicated by the response, paging information associated with the second wireless communication device.

Aspect 23: The method of any of Aspects 1-22, further comprising: transmitting, to the second wireless communication device, spatial domain information to be used by the first wireless communication device that is selected in accordance with the one or more channel characteristics.

Aspect 24: The method of any of Aspects 1-23, wherein communicating with the second wireless communication device comprises: transmitting, to the second wireless communication device, spatial domain information to be used by the first wireless communication device for beam failure recovery events, the spatial domain information being selected in accordance with the one or more channel characteristics; and transmitting, to the second wireless communication device, one or more reference signals using the spatial domain information in association with an occurrence of a beam failure recovery event.

Aspect 25: The method of any of Aspects 1-24, wherein the first wireless communication device is a network node and the second wireless communication device is a user equipment.

Aspect 26: The method of any of Aspects 1-25, wherein the first wireless communication device is a user equipment and the second wireless communication device is a network node.

Aspect 27: A method of wireless communication performed by a digital twin (DT) entity, comprising: receiving, from a first wireless communication device, a request for channel characteristics of a communication link associated with a second wireless communication device, a three-dimensional digital model of a physical operating environment associated with the first wireless communication device and the second wireless communication device being accessible by the DT entity; and transmitting, to the first wireless communication device, a response indicating one or more channel characteristics for the communication link that are obtained via the three-dimensional digital model.

Aspect 28: The method of Aspect 27, wherein the communication link is between the second wireless communication device and a transmission reception point associated with the first wireless communication device.

Aspect 29: The method of any of Aspects 27-28, wherein the request indicates at least one of: first location information associated with the first wireless communication device, or second location information associated with the second wireless communication device.

Aspect 30: The method of any of Aspects 27-29, wherein the request indicates timing information applicable to the request for channel characteristics, the one or more channel characteristics being associated with a time indicated by the timing information.

Aspect 31: The method of any of Aspects 27-30, wherein the request indicates beam information associated with the first wireless communication device.

Aspect 32: The method of any of Aspects 27-31, wherein the request indicates beam information associated with the second wireless communication device.

Aspect 33: The method of any of Aspects 27-32, wherein the request indicates a requested periodicity for periodic responses to the request.

Aspect 34: The method of Aspect 33, wherein transmitting the response comprises: transmitting, in accordance with the requested periodicity, one or more responses indicating respective sets of one or more channel characteristics for the communication link.

Aspect 35: The method of any of Aspects 27-34, wherein the request indicates one or more trigger events associated with the request.

Aspect 36: The method of Aspect 35, wherein receiving the response is in association with an occurrence of a trigger event of the one or more trigger events.

Aspect 37: The method of any of Aspects 35-36, wherein the one or more trigger events include a change in one or more channel parameters satisfying respective thresholds.

Aspect 38: The method of any of Aspects 27-37, wherein the request indicates one or more requested channel characteristics.

Aspect 39: The method of Aspect 38, wherein the one or more requested channel characteristics include at least one of: one or more dominant propagation directions, one or more beam pairs, spatial domain information associated with the communication link, or one or more channel parameters.

Aspect 40: The method of any of Aspects 27-39, wherein the request indicates one or more requested carrier frequencies and respective bandwidths to be associated with the channel characteristics.

Aspect 41: The method of any of Aspects 27-40, wherein the one or more channel characteristics are associated with a downlink channel of the communication link.

Aspect 42: The method of any of Aspects 27-41, wherein the one or more channel characteristics are associated with an uplink channel of the communication link.

Aspect 43: The method of any of Aspects 27-42, wherein the response indicates a validity time period during which the one or more channel characteristics are valid.

Aspect 44: The method of any of Aspects 27-43, further comprising: receiving, from the first wireless communication device, beam registration information indicating beam information for respective beams of one or more beams associated with the first wireless communication device.

Aspect 45: The method of Aspect 44, wherein the one or more beams include at least one of: synchronization signal block beams, channel state information reference signal beams, or downlink reference signal beams.

Aspect 46: The method of any of Aspects 44-45, wherein the one or more beams are associated with respective identifiers, and wherein the request indicates one or more identifiers, from the respective identifiers, to indicate which of the one or more beams are associated with the request.

Aspect 47: The method of any of Aspects 27-46, further comprising: receiving, from the second wireless communication device, beam registration information indicating beam information for respective beams of one or more beams associated with the second wireless communication device.

Aspect 48: The method of any of Aspects 27-47, wherein the first wireless communication device is a network node and the second wireless communication device is a user equipment.

Aspect 49: The method of any of Aspects 27-48, wherein the first wireless communication device is a user equipment and the second wireless communication device is a network node.

Aspect 50: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-49.

Aspect 51: An apparatus for wireless communication at a device, the apparatus comprising one or more memories and one or more processors coupled to the one or more memories, the one or more processors configured to cause the device to perform the method of one or more of Aspects 1-49.

Aspect 52: An apparatus for wireless communication, the apparatus comprising at least one means for performing the method of one or more of Aspects 1-49.

Aspect 53: A non-transitory computer-readable medium storing code for wireless communication, the code comprising instructions executable by one or more processors to perform the method of one or more of Aspects 1-49.

Aspect 54: A non-transitory computer-readable medium storing a set of instructions for wireless communication, the set of instructions comprising one or more instructions that, when executed by one or more processors of a device, cause the device to perform the method of one or more of Aspects 1-49.

Aspect 55: A device for wireless communication, the device comprising a processing system that includes one or more processors and one or more memories coupled with the one or more processors, the processing system configured to cause the device to perform the method of one or more of Aspects 1-49.

Aspect 56: An apparatus for wireless communication at a device, the apparatus comprising one or more memories and one or more processors coupled to the one or more memories, the one or more processors individually or collectively configured to cause the device to perform the method of one or more of Aspects 1-49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A first wireless communication device for wireless communication, comprising:

one or more memories; and one or more processors, coupled to the one or more memories, configured to cause the first wireless communication device to:

transmit, to a digital twin (DT) entity, a request for channel characteristics of a communication link associated with a second wireless communication device, the DT entity being associated with a three-dimensional digital model of a physical operating environment associated with the first wireless communication device and the second wireless communication device;

receive, from the DT entity, a response indicating one or more channel characteristics for the communication link that are associated with the three-dimensional digital model; and communicate with the second wireless communication device in association with the one or more channel characteristics.

2. The first wireless communication device of claim 1, wherein the communication link is between the second wireless communication device and a transmission reception point associated with the first wireless communication device.

3. The first wireless communication device of claim 1, wherein the request indicates at least one of:

first location information associated with the first wireless communication device, or second location information associated with the second wireless communication device.

4. The first wireless communication device of claim 1, wherein the request indicates timing information applicable to the request for channel characteristics, the one or more channel characteristics being associated with a time indicated by the timing information.

5. The first wireless communication device of claim 1, wherein the request indicates beam information associated with the first wireless communication device.

6. The first wireless communication device of claim 1, wherein the request indicates beam information associated with the second wireless communication device.

7. The first wireless communication device of claim 1, wherein the request indicates a requested periodicity for periodic responses to the request.

8. The first wireless communication device of claim 1, wherein the request indicates one or more trigger events associated with the request.

9. The first wireless communication device of claim 8, wherein receiving the response is in association with an occurrence of a trigger event of the one or more trigger events.

10. A method of wireless communication performed by a first wireless communication device, comprising:

transmitting, to a digital twin (DT) entity, a request for channel characteristics of a communication link associated with a second wireless communication device, the DT entity being associated with a three-dimensional digital model of a physical operating environment associated with the first wireless communication device and the second wireless communication device;

receiving, from the DT entity, a response indicating one or more channel characteristics for the communication link that are associated with the three-dimensional digital model; and communicating with the second wireless communication device in association with the one or more channel characteristics.

11. The method of claim 10, wherein the request indicates one or more trigger events associated with the request, and wherein the one or more trigger events include a change in one or more channel parameters satisfying respective thresholds.

12. The method of claim 10, wherein the request indicates one or more requested channel characteristics.

13. The method of claim 10, wherein the request indicates one or more requested carrier frequencies and respective bandwidths to be associated with the channel characteristics.

14. The method of claim 10, wherein the response indicates a validity time period during which the one or more channel characteristics are valid.

15. The method of claim 10, further comprising:

transmitting, to the DT entity, beam registration information indicating beam information for respective beams of one or more beams associated with the first wireless communication device.

16. The method of claim 15, wherein the one or more beams are associated with respective identifiers, and wherein the request indicates one or more identifiers, from the respective identifiers, to indicate which of the one or more beams are associated with the request.

17. A non-transitory computer-readable medium storing a set of instructions for wireless communication, the set of instructions comprising:

one or more instructions that, when executed by one or more processors of a first wireless communication device, cause the first wireless communication device to:

transmit, to a digital twin (DT) entity, a request for channel characteristics of a communication link associated with a second wireless communication device, the DT entity being associated with a three-dimensional digital model of a physical operating environment associated with the first wireless communication device and the second wireless communication device;

receive, from the DT entity, a response indicating one or more channel characteristics for the communication link that are associated with the three-dimensional digital model; and communicate with the second wireless communication device in association with the one or more channel characteristics.

18. The non-transitory computer-readable medium of claim 17, wherein the one or more instructions, that cause the first wireless communication device to communicate with the second wireless communication device, cause the first wireless communication device to:

communicate using one or more beams or one or more beam pairs indicated by the response.

19. The non-transitory computer-readable medium of claim 17, wherein the one or more instructions, that cause the first wireless communication device to communicate with the second wireless communication device, cause the first wireless communication device to:

transmit, via one or more beams indicated by the response, paging information associated with the second wireless communication device.

20. The non-transitory computer-readable medium of claim 17, wherein the one or more instructions, that cause the first wireless communication device to communicate with the second wireless communication device, cause the first wireless communication device to:

transmit, to the second wireless communication device, spatial domain information to be used by the first wireless communication device for beam failure recovery events, the spatial domain information being selected in accordance with the one or more channel characteristics; and transmit, to the second wireless communication device, one or more reference signals using the spatial domain information in association with an occurrence of a beam failure recovery event.

* * * * *